United States Patent
Pyeon et al.

(10) Patent No.: US 8,060,691 B2
(45) Date of Patent: Nov. 15, 2011

(54) APPARATUS AND METHOD OF PAGE PROGRAM OPERATION FOR MEMORY DEVICES WITH MIRROR BACK-UP OF DATA

(75) Inventors: Hong Beom Pyeon, Ottawa (CA); Jin-Ki Kim, Ottawa (CA); HakJune Oh, Ottawa (CA)

(73) Assignee: MOSAID Technologies Incorporated, Ottawa (CA)

( * ) Notice: Subject to any disclaimer, the term of this patent is extended or adjusted under 35 U.S.C. 154(b) by 0 days.

(21) Appl. No.: 13/022,166

(22) Filed: Feb. 7, 2011

(65) Prior Publication Data

US 2011/0131445 A1   Jun. 2, 2011

Related U.S. Application Data

(63) Continuation of application No. 12/832,121, filed on Jul. 8, 2010, now Pat. No. 7,908,429, which is a continuation of application No. 12/030,235, filed on Feb. 13, 2008, now Pat. No. 7,774,537.

(60) Provisional application No. 60/891,115, filed on Feb. 22, 2007.

(51) Int. Cl.
G06F 13/00 (2006.01)
G06F 13/28 (2006.01)
G06F 3/00 (2006.01)
G06F 5/00 (2006.01)

(52) U.S. Cl. . 711/103; 711/118; 711/154; 711/E12.008; 710/52

(58) Field of Classification Search .................. 711/103, 711/118, 154, E12.008; 710/52
See application file for complete search history.

(56) References Cited

U.S. PATENT DOCUMENTS

| | | | |
|---|---|---|---|
| 4,174,536 A | 11/1979 | Misunas et al. |
| 4,733,376 A | 3/1988 | Ogawa |
| 4,796,231 A | 1/1989 | Pinkham |
| 4,899,316 A | 2/1990 | Nagami |
| 5,038,299 A | 8/1991 | Maeda |
| 5,126,808 A | 6/1992 | Montalvo et al. |

(Continued)

FOREIGN PATENT DOCUMENTS

EP   0952525   10/1999

(Continued)

OTHER PUBLICATIONS

Cho, T. et al., "A Dual Mode NAND Flash Memory: 1-Gb Multilevel and HighPerformance 512-Mb Single-Level Modes", IEEE Journal of Solid-State Circuits, vol. 36, No. 11, Nov. 2001, pp. 1700-1706.

(Continued)

*Primary Examiner* — Edward Dudek, Jr.
(74) *Attorney, Agent, or Firm* — Shuji Sumi

(57) ABSTRACT

An apparatus and method of page program operation is provided. When performing a page program operation with a selected memory device, a memory controller loads the data into the page buffer of one selected memory device and also into the page buffer of another selected memory device in order to store a back-up copy of the data. In the event that the data is not successfully programmed into the memory cells of the one selected memory device, then the memory controller recovers the data from the page buffer of the other memory device. Since a copy of the data is stored in the page buffer of the other memory device, the memory controller does not need to locally store the data in its data storage elements.

11 Claims, 20 Drawing Sheets

U.S. PATENT DOCUMENTS

| | | |
|---|---|---|
| 5,136,292 A | 8/1992 | Ishida |
| 5,175,819 A | 12/1992 | Le Ngoc et al. |
| 5,243,703 A | 9/1993 | Farmwald et al. |
| 5,249,270 A | 9/1993 | Stewart et al. |
| 5,280,539 A | 1/1994 | Yeom et al. |
| 5,365,484 A | 11/1994 | Cleveland et al. |
| 5,404,460 A | 4/1995 | Thomsen et al. |
| 5,440,694 A | 8/1995 | Nakajima |
| 5,452,259 A | 9/1995 | McLaury |
| 5,473,563 A | 12/1995 | Suh et al. |
| 5,473,566 A | 12/1995 | Rao |
| 5,473,577 A | 12/1995 | Mullins et al. |
| 5,602,780 A | 2/1997 | Diem et al. |
| 5,636,342 A | 6/1997 | Jeffries |
| 5,671,178 A | 9/1997 | Park et al. |
| 5,721,840 A | 2/1998 | Soga |
| 5,729,683 A | 3/1998 | Le et al. |
| 5,740,379 A | 4/1998 | Hartwig |
| 5,761,146 A | 6/1998 | Yoo et al. |
| 5,771,199 A | 6/1998 | Lee |
| 5,802,006 A | 9/1998 | Ohta |
| 5,818,785 A | 10/1998 | Ohshima |
| 5,828,899 A | 10/1998 | Richard et al. |
| 5,835,935 A | 11/1998 | Estakhri et al. |
| 5,859,809 A | 1/1999 | Kim |
| 5,872,994 A | 2/1999 | Akiyama et al. |
| 5,937,425 A | 8/1999 | Ban |
| 5,941,974 A | 8/1999 | Babin |
| 5,959,930 A | 9/1999 | Sakurai |
| 5,995,417 A | 11/1999 | Chen et al. |
| 6,002,638 A | 12/1999 | John |
| 6,085,290 A | 7/2000 | Smith et al. |
| 6,091,660 A | 7/2000 | Sasaki et al. |
| 6,107,658 A | 8/2000 | Itoh et al. |
| 6,144,576 A | 11/2000 | Leddige et al. |
| 6,148,364 A | 11/2000 | Srinivasan et al. |
| 6,178,135 B1 | 1/2001 | Kang |
| 6,230,233 B1 | 5/2001 | Lofgren et al. |
| 6,304,921 B1 | 10/2001 | Rooke |
| 6,317,350 B1 | 11/2001 | Pereira et al. |
| 6,317,352 B1 | 11/2001 | Halbert et al. |
| 6,438,064 B2 | 8/2002 | Ooishi |
| 6,442,098 B1 | 8/2002 | Kengeri |
| 6,453,365 B1 | 9/2002 | Habot |
| 6,456,528 B1 | 9/2002 | Chen |
| 6,535,948 B1 | 3/2003 | Wheeler et al. |
| 6,584,303 B1 | 6/2003 | Kingswood et al. |
| 6,594,183 B1 | 7/2003 | Lofgren et al. |
| 6,601,199 B1 | 7/2003 | Fukuda et al. |
| 6,611,466 B2 | 8/2003 | Lee et al. |
| 6,658,582 B1 | 12/2003 | Han |
| 6,680,904 B1 | 1/2004 | Kaplan et al. |
| 6,697,936 B2 | 2/2004 | Johnson |
| 6,715,044 B2 | 3/2004 | Lofgren et al. |
| 6,717,847 B2 | 4/2004 | Chen |
| 6,732,221 B2 | 5/2004 | Ban |
| 6,754,807 B1 | 6/2004 | Parthasarathy et al. |
| 6,763,426 B1 | 7/2004 | James et al. |
| 6,788,609 B2 | 9/2004 | Yamagami et al. |
| 6,799,235 B2 | 9/2004 | Bormann et al. |
| 6,807,103 B2 | 10/2004 | Cavaleri et al. |
| 6,807,106 B2 | 10/2004 | Gonzales et al. |
| 6,816,933 B1 | 11/2004 | Andreas |
| 6,850,443 B2 | 2/2005 | Lofgren et al. |
| 6,853,557 B1 | 2/2005 | Haba et al. |
| 6,853,573 B2 | 2/2005 | Kim et al. |
| 6,928,501 B2 | 8/2005 | Andreas et al. |
| 6,944,697 B2 | 9/2005 | Andreas |
| 6,950,325 B1 | 9/2005 | Chen |
| 6,967,874 B2 | 11/2005 | Hosono |
| 6,996,644 B2 | 2/2006 | Schock et al. |
| 7,073,022 B2 | 7/2006 | El-Batal et al. |
| 7,111,140 B2 | 9/2006 | Estakhri et al. |
| 7,123,541 B2 | 10/2006 | Bell et al. |
| 7,165,153 B2 | 1/2007 | Vogl |
| 7,190,617 B1 | 3/2007 | Harari et al. |
| 7,774,537 B2 * | 8/2010 | Pyeon et al. .................. 711/103 |
| 2002/0124129 A1 * | 9/2002 | Zilberman .................. 711/103 |
| 2002/0161941 A1 | 10/2002 | Chue et al. |
| 2004/0001380 A1 | 1/2004 | Becca et al. |
| 2004/0019736 A1 | 1/2004 | Kim et al. |
| 2004/0039854 A1 | 2/2004 | Estakhri et al. |
| 2004/0199721 A1 | 10/2004 | Becca, et al. |
| 2004/0230738 A1 | 11/2004 | Lim et al. |
| 2004/0230743 A1 | 11/2004 | Ware et al. |
| 2005/0120163 A1 * | 6/2005 | Chou et al. .................. 711/103 |
| 2005/0160218 A1 | 7/2005 | See et al. |
| 2005/0213421 A1 | 9/2005 | Polizzi et al. |
| 2005/0286298 A1 | 12/2005 | Hyvonen et al. |
| 2006/0050594 A1 | 3/2006 | Park |
| 2006/0198202 A1 * | 9/2006 | Erez .................. 365/185.29 |
| 2006/0224789 A1 | 10/2006 | Cho et al. |
| 2006/0271605 A1 | 11/2006 | Petruzzo |
| 2007/0050536 A1 | 3/2007 | Kolokowsky |
| 2007/0083701 A1 | 4/2007 | Kapil |
| 2007/0177436 A1 | 8/2007 | Davis et al. |
| 2008/0155207 A1 * | 6/2008 | Eilert et al. .................. 711/154 |
| 2008/0205168 A1 | 8/2008 | Pyeon et al. |

FOREIGN PATENT DOCUMENTS

| | | |
|---|---|---|
| WO | WO0169411 | 9/2001 |
| WO | PCT/CA2007/001428 | 12/2007 |
| WO | PCT/CA2008/000250 | 6/2008 |
| WO | PCT/CA2008/000219 | 8/2008 |

OTHER PUBLICATIONS

64 Megabit CMOS 3.0 Volt Flash Memory with 50MHz SPI. Spansion, pp. 1-22 Sep. 6, 2006.

M-Systems Flash Disk Pioneers Ltd., "DiskOnChip H1 4Gb (512MByte) and 8Gb (1 GByte) High Capacity Flash Disk with NAND and x2 Technology", Data Sheet, Rev. 0.5 (Preliminary), pp. 1-66, Jan. 2005.

Tal, A., "Guidelines for Integrating DiskOnChip in a Host System", AP-DOC-1004, Rev. 1.0, M-Systems Flash Pioneers Ltd., pp. 1-15, Jan. 2004.

Samsung Electronics Co. Ltd, OneNAND4G(KFW4G16Q2M-DEB6), OneNAND2G(KFH2G16Q2M-DEB6), OneNAND1G(KFW1G16Q2M-DEB6) Flash Memory, OneNANDTM Specification Ver. 1.2, pp. 1-125, Dec. 23, 2005.

Kennedy, J., et al., "A 2Gb/s Point-to-Point Heterogeneous Voltage Capable DRAM Interface for Capacity-Scalable Memory Subsystems", ISSCC 2004/Session 1IDRAM/11.8, IEEE International Solid-State Circuits Conference, Feb. 15-19, 2004, vol. 1, pp. 214-523.

Kim, Jae-Kwan, et al., "A 3.6Gb/s/pin Simultaneous Bidirectional (SBD) 110 Interface for High-Speed DRAM",ISSCC 2004/Session 22/DSL and Multi-Gb/s 11022.7, IEEE International Solid-State Circuits Conference Feb. 15-19, 2004, vol. 1, pp. 414-415.

"HyperTransport TM 1/0 Link Specification", Revision 2.00, Document No. HTC20031217-0036-00, Hypertransport Technology Consortium, pp. 1-325, Apr. 27, 2005.

"IEEE Standard for High-Bandwidth Memory Interface Based on Scalable Coherent Interface (SCI) Signaling Technology (RamLink)", IEEE Std. 1596.4-1996, The Institute of Electrical Electronics Engineers, Inc., pp. i-91, Mar. 1996.

Oshima, et al., "High-Speed Memory Architectures for Multimedia Applications", Circuits & Devices, IEEE 8755-3996/97, pp. 8-13, Jan. 1997.

Gjessing, S., et al., "Ram Link: A High-Bandwidth Point-to-Point Memory Architecture", Proceedings CompCon 1992, IEEE 0-8186-2655-0/92, pp. 328-331, Feb. 24-28, 1992.

Gjessing, S., et al., "Performance of the Ram Link Memory Architecture", Proceedings of the Twenty-Seventh Annual Hawaii International Conference on System Sciences, IEEE 1060-3425/94, pp. 154-162, Jan. 1994.

Gjessing. S., et al., "A RAM Link for High Speed", Special ReportlMemory, IEEE Spectrum, pp. 52-53, Oct. 1992.

Diamond, S.L., "SyncLink: High: High-speed DRAM for the Future", Micro Standards, IEEE Micro, pp. 74-75, Dec. 1996.

Samsung Electronics, "DDR2 Fully Buffered DIMM 240pin FBDIMMS based on 512Mb C-die" Rev. 1.3, Sep. 2006, pp. 1-32, Sep. 2006.

"HyperTransport TM 1/0 Link Specification", Revision 3.00, Document No. HTC20051222-0046-0008, Hypertransport Technology Consortium, pp. 1-428, Apr. 2006.

Hara, T. et al., "A 146mm2 8Gb NAND Flash Memory with 70nm CMOS Technology", ISSCC Session 2 Non-Volatile Memory 2.1, IEEE International Solid-State Circuits Conference, Feb. 2005, pp. 44, 45 and 584.

Byeon. D. et al.. "An 8Gb Multi-Level NAND Flash Memory with 63nm STI CMOS Process Technology", ISSCC Session 2 Non-Volatile Memory 2.2, IEEE International Solid-State Circuits Conference, Feb. 2005, pp. 46 and 47.

Tanzawa, T. et al., "Circuit Techniques for a 1.8-V-Only NAND Flash Memory", IEEE Journal of Solid-State Circuits, vol. 37, No. 1, Jan. 2002, pp. 84-89.

Saito, et al., "A Programmable 80ns 1Mb CMOS EPROM", IEEE ISSCC Digest of Technical Papers, pp. 176-177,340, Feb. 14, 1985.

Momodomi, M. et al., "A 4 Mb NAND EEPROM with tight programmed Vt Distribution", IEEE Journal of Solid-State Circuits, vol. 26, Issue 4, Apr. 1991, pp. 492-496.

Ohtsuka, N. et al., "A 4-Mbit CMOS EPROM", IEEE Journal of Solid-State Circuits, vol. 22, Issue 5, Oct. 1987, pp. 669-675.

Kim, et al. "A 120-mm2 64 Mb NAND Flash Memory Archieving 180 ns/Byte Effective Program Speed," IEEE Journal of Solid-State Circuits, vol. 32, No. 5, May 1977, pp. 670-680.

Suh, K. et al., "A 3.3 V 32 Mb NAND Flash Memory with Incremental Step Pulse Programming Scheme", IEEE Journal of Solid-State Circuits, vol. 30, No. 11, Nov. 1995, pp. 1149-1156.

Takeuchi, K. et al., "A multipage cell architecture for high-speed programming multilevelNAND flash memories", IEEE Journal of Solid-State Circuits, vol. 33, Issue 8, Aug. 1998, pp. 1228-1238.

Tanzawa, et al., "A dynamic analysis of the Dickson charge pump circuit;" IEEE J. Solid-State Circuits, vol. 32, No. 8, pp. 1231-1240, Aug. 1997.

Tanaka, T. et al., "A quick intelligent page-programming architecture and a shieldedbitline sensing method for 3 Vonly NAND flash memory", IEEE Journal of Solid-state Circuits, vol. 29, Issue 11, Nov. 1994, pp. 1366-1373.

Imamiya, K. et al., "A 125-mm2 1-Gb NAND Flash Memory with 10-MByte/s Program Speed", IEEE Journal of Solid-State Circuits, vol. 37, No. 11, Nov. 2002, pp. 1493-1501.

Lee, J. et al., "High-Performance I-Gb NAND Flash Memory with 0.12-om Technology", IEEE Journal of Solid-State Circuits, vol. 37, No. 11, Nov. 2002, pp. 1502-1509.

Jung, T. et al., "A 117-mm2 3.3-V Only 128-Mb Multilevel NAND Flash Memory for Mass Storage Applications," IEEE Journal of Solid-State Circuits, vol. 31, No. 11, Nov. 1996, pp. 1575-1583.

Tomita, N. et al., "A 62-ns 16Mb CMOS EPROMm with Voltage Stress Relaxation Technique" IEEE Journal of Solid-State Circuits vol. 26, No. 11, Nov. 1991, pp. 1593-1599.

Kirisawa, R. et al., "A NAND Structured Cell with a new Programming Technology for Highly Reliable 5V-Only Flash 32 16 EEPROM", 1990 Symposium on VLSI Technology, Jun. 4, 1990, CH 2874-6, 90/0000-0129 1990 IEEE, Honolulu, US, 0 pp. 129-130, Jan. 1990.

Aritome, S. et al., "A Reliable Bi-Polarity Write/Erase Technology in Flash EEPROMS", Inn Electron Devices Meeting, 1990, Technical Digest, Dec. 9-12, 1990, pp. 111-114.

Shirota, R., et al., "A 2.3um2 Memory Cell Structure for 16Mb NAND EEPROMs", International Electron Devices Meeting 1990, Technical Digest, (1990), pp. 103-106, Jan. 1990.

Hara, T. et al., "A 146-mmA2 8-Gb Multi-Level NAND Flash Memory With 70-nm CMOS Technology", IEEE Journal of Solid State Circuits, Jan. 2006, vol. 41, No. 1, pp. 161-169.

Lee, S. et al., "A 3.3V 4Gb Four-Level NAND Flash Memory with 90nm CMOS Technology", ISSCC 2004/Session 2 36 Non-Volatile Memory/2.7, IEEE International Solid-State Circuits Conference, Feb. 15-19, 2004,Digest of Technical Papers, pp. 52-513, VoL.!, XP010722148, ISBN: 0-7803-8267-6.

Takeuchi, K. et ai, "A 56nm CMOS 99mm2 8Gb Multi-level NAND Flash Memory with 10MB/s Program Throughput", 37 Solid-State Circuits, 2006 IEEE International Conference Digest of Technical Papers, Feb. 6-9, 2006, ISBN: 1-4244-0079-1.

Samsung Electronics Co. Ltd, "256M × 8 Bill 128 M× 16 Bill 512M×8 Bit NAND Flash Memory", K9K4GO8U1M, May 6, 2005, pp. 1-41.

Samsung Electronics Co. Ltd, "IG × 8 BilliG × 8 Bit NAND Flash Memory", K9F8G08UXM, May 31, 2007, pp. 1-54.

Samsung Electronics Co. Ltd, "512M × 8 BilliG × 8 Bit NAND Flash Memory", K9XXGO8UXA, May 7, 2006, pp. 1-43.

Samsung Electronics Co. Ltd, "IG × 8 Bill2G × 8 Bill4G × 8 Bit NAND Flash Memory", K9XXGO8UXA, Jul. 18, 2006, pp. 1-50.

Choi, Young, "16-Gbit MLC NAND Flash Weighs In", EETimes. com, Jul. 7, 2007, pp. 1-3, http://www.eetimes.com/showArticle.jhtml?articleID=201200825.

Gal, et al., "Algorithms and data structures for flash memories", ACM Computing Surveys (CSUR), vol. 37, No. 2, p. 138-163, Jun. 2005, Tel Aviv University.

Lee J. et al., "A 90-nm CMOS 1.8-V 2Gb NAND Flash Memory for Mass Storage Applications", IEEE Journal of Solid-State Circuits, vol. 38, No. 11, Nov. 2003. pp. 1934-1942.

Samsung Electronics Co. Ltd, "2G × 8 Bit NAND Flash Memory", K9GAGO8UOM, Apr. 12, 2006, pp. 1-48.

Toshiba, "16 GBIT (2G × 8 Bit) CMOS NAND E2PROM (Multi-Level-Cell)", TC58NVG4D1 DTGOO, Nov. 9, 2006.

Toshiba, "2GB IT (256M × 8 Bits) CMOS NAND E2PROM", TH58NVG1S3AFT05, May 19, 2003.

Intel Corporation, "Intel®Advanced+ Boot Block Flash Memory (C3)", May 2005, pp. 1-72.

King, et al., "Communicating with Daisy Chained MCP42XXX Digital Potentiometers", Microchip AN747, pp. 1-8, 2001, Jan. 30, 2001.

ATMEL Corp., "High Speed Small Sectored SPI Flash Memory", pp. 1-22, Oct. 2004.

* cited by examiner

Command Set

| Operation | Command (2 Bytes) | | Row Address (3 Bytes) | Column Address (2 Bytes) | Input Data (1 to 2112 Bytes) |
|---|---|---|---|---|---|
| | DA (1 Byte) | OP Code (1 Byte) | | | |
| Page Read | Valid | 0Xh | Valid | - | - |
| Page Read for Copy | Valid | 1Xh | Valid | - | - |
| Burst Data Read | Valid | 2Xh | - | Valid | - |
| Burst Data Load Start | Valid | 4Xh | - | Valid | Valid |
| Burst Data Load | Valid | 5Xh | - | Valid | Valid |
| Page Program | Valid | 6Xh | Valid | - | - |
| Block Erase Address Input | Valid | 8Xh | Valid | - | - |
| Page-pair Erase Address Input | Valid | 9Xh | Valid | - | - |
| Erase | Valid | AXh | - | - | - |
| Operation Abort | Valid | CXh | - | - | - |
| Read Device Status | Valid | D0h | - | - | - |
| Read Device Information Register | Valid | F1h | - | - | - |
| Read Link Configuration Register | Valid | FEh | - | - | - |
| Write Link Configuration Register[2] | FFh | FFh | - | - | Valid (1 Byte Only) |

FIG. 12

| /RST | /CE | CSI | DSI | Mode |
|---|---|---|---|---|
| H | L | H | L | Command Data Packet |
| H | L | L | H | Read Data Packet |
| H | L | L | L | NOP (NO Operation) |
| H | H | X | X | Standby |
| L | X | X | X | Reset |

FIG. 13

Command & Address Format

| | Bit7 | Bit6 | Bit5 | Bit4 | Bit3 | Bit2 | Bit1 | Bit0 |
|---|---|---|---|---|---|---|---|---|
| Command | | | | | | | | |
| 1st Byte | CA7 | CA6 | CA5 | CA4 | CA3 | CA2 | CA1 | CA0 |
| 2nd Byte | OP7 | OP6 | OP5 | OP4 | OP3[BA3] | OP2[BA2] | OP1[BA1] | OP0[BA0] |
| Row Address | | | | | | | | |
| 1st Byte | RA7 | RA6 | RA5 | RA4 | RA3 | RA2 | RA1 | RA0 |
| 2nd Byte | RA15 | RA14 | RA13 | RA12 | RA11 | RA10 | RA9 | RA8 |
| 3rd Byte | Low | Low | Low | Low | Low | Low | Low | RA16 |
| Column Address | | | | | | | | |
| 1st Byte | CA7 | CA6 | CA5 | CA4 | CA3 | CA2 | CA1 | CA0 |
| 2nd Byte | Low | Low | Low | Low | CA11 | CA10 | CA9 | CA8 |

FIG. 14

APPARATUS AND METHOD OF PAGE PROGRAM OPERATION FOR MEMORY DEVICES WITH MIRROR BACK-UP OF DATA

CROSS REFERENCE TO RELATED APPLICATIONS

This application is a Continuation of U.S. application Ser. No. 12/832,121 filed on Jul. 8, 2010 (now U.S. Pat. No. 7,908,429 issued on Mar. 15, 2011) which is a continuation of U.S. application Ser. No. 12/030,235 filed on Feb. 13, 2008 (now U.S. Pat. No. 7,774,537 issued on Aug. 20, 2010) which claims the benefit of prior U.S. Provisional Patent Application No. 60/891,115 filed on Feb. 22, 2007, disclosures of which are hereby incorporated by reference in their entirety.

TECHNICAL FIELD

The present invention relates generally to semiconductor devices. More particularly, the present invention relates to an apparatus and a method for page program operation for memory devices.

BACKGROUND

Electronic equipment uses memory devices, for example, flash memories, for storing data or information. In a memory system, a memory controller programs a selected flash memory device by transmitting data to a page buffer in a selected flash memory device where it is stored temporarily. Programming of the data from the page buffer into in the flash memory commences and the programming result is verified and a verify result is produced as "pass" or "fail". Program and verify operations are performed several times for a "program time" specified period. After the program time, in the event of failure, the data is re-loaded from the memory controller to resume the page program operation in the same selected device.

A drawback is that flash memories require a long program time, for example, to verify the program status. The memory inside of the memory controller must hold the initial program data in order to recover the original program data in the event of program failure. The initial program data occupies space in the memory of the memory controller, with the result that the memory space can not be used for other purposes.

SUMMARY

According to one aspect of the present invention, there is provided an apparatus for controlling a plurality of memory devices interconnected in-series, each of the memory devices having a page buffer and memory cells. The apparatus comprises a data processor configured to execute a page program operation with a mirror back-up of data by: writing data to the page buffer of a selected memory device of the plurality of memory devices and to the page buffer of another memory device of the plurality of memory devices; instructing the selected memory device to program the data loaded in its page buffer into its memory cells; and determining whether the data is not successfully programmed into the memory cells of the selected memory device, recover the data from the page buffer of the another memory device.

For example, the data processor is configured to recover the data from the page buffer of the another memory device by: reading back the data from the page buffer of the another memory device without programming the data into the memory cells of the another memory device.

The apparatus may further comprise data storage for storing the data prior to writing the data to the page buffer of the selected memory device and to the page buffer of the another memory device.

According to another aspect of the present invention, there is provided a system comprising: a plurality of memory devices that are interconnected in-series, each memory device having a page buffer and memory cells; and an apparatus for controlling the plurality of memory devices, the apparatus comprising a data processor configured to execute a page program operation with a mirror back-up for data by: writing data to the page buffer of a selected memory device of the plurality of memory devices and to the page buffer of another memory device of the plurality of memory devices; instructing the selected memory device to program the data loaded in its page buffer into its memory cells; and if the data is not successfully programmed into the memory cells of the selected memory device, recover the data from the page buffer of the another memory device.

According to another aspect of the present invention, there is provided a method for controlling a plurality of memory devices that are interconnected in-series, each memory device having a page buffer and memory cells. The method comprises: transmitting data to the page buffer of a selected memory device of the plurality of memory devices and to the page buffer of another memory device of the plurality of memory devices; instructing the selected memory device to program the data loaded in its page buffer into its memory cells; and if the data is not successfully programmed into the memory cells of the selected memory device, recovering the data from the page buffer of the another memory device.

For example, the step of recovering the data from the page buffer of the another memory device comprises reading back the data from the page buffer of the another memory device without programming the data into the memory cells of the another memory device.

The method may further comprise storing the data prior to writing the data to the page buffer of the selected memory device and to the page buffer of the another memory device; freeing up space where the data is occupied before determining whether the data has been successfully programmed into the memory cells of the selected memory device.

According to another aspect of the present invention, there is provided a memory device for use as one of a set of memory devices connected in-series. The memory device comprises: an input connection; an output connection; an identification of a device address of the memory device; and a device controller configured to: receive messages to enter and exit a multi-address detection mode, and enter and exit the multi-address detection mode accordingly; receive a command over the input connection, the command comprising a device address; while not in the multi-address detection mode, process the command only if the device address of the command matches the device address of the device; and while in the multi-address detection mode: i) process the command if the device address of the command is the same as the device address of the device and ii) process the command if the device address of the command is the same as the device address of at least one other predetermined device.

According to another aspect of the present invention, there is provided a method in a memory device forming part of a set of memory devices connected in-series, the method comprising: maintaining a device address; receiving messages to enter and exit a multi-address detection mode; receiving a command comprising a device address; while not in the multi-address detection mode, processing the command only if the destination address matches the device address; and while in the multi-address detection mode: processing the command if the device address of the command is the same as the device address of the device; and processing the command if the device address of the command is the same as the device address of at least one other predetermined device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments will now be described with reference to the attached drawings in which:

FIG. 12 is a table of an example command set;

FIG. 13 is a table of an example operation table;

FIG. 14 is a table showing an example of a detailed command and address format;

DETAILED DESCRIPTION

In the following detailed description of sample embodiments of the invention, reference is made to the accompanying drawings which form a part hereof, and in which is shown by way of illustration specific sample embodiments in which the present invention may be practiced. These embodiments are described in sufficient detail to enable those skilled in the art to practice the present invention, and it is to be understood that other embodiments may be utilized and that logical, mechanical, electrical, and other changes may be made without departing from the scope of the present invention. The following detailed description is, therefore, not to be taken in a limiting sense, and the scope of the present invention is defined by the appended claims.

Figure 1:
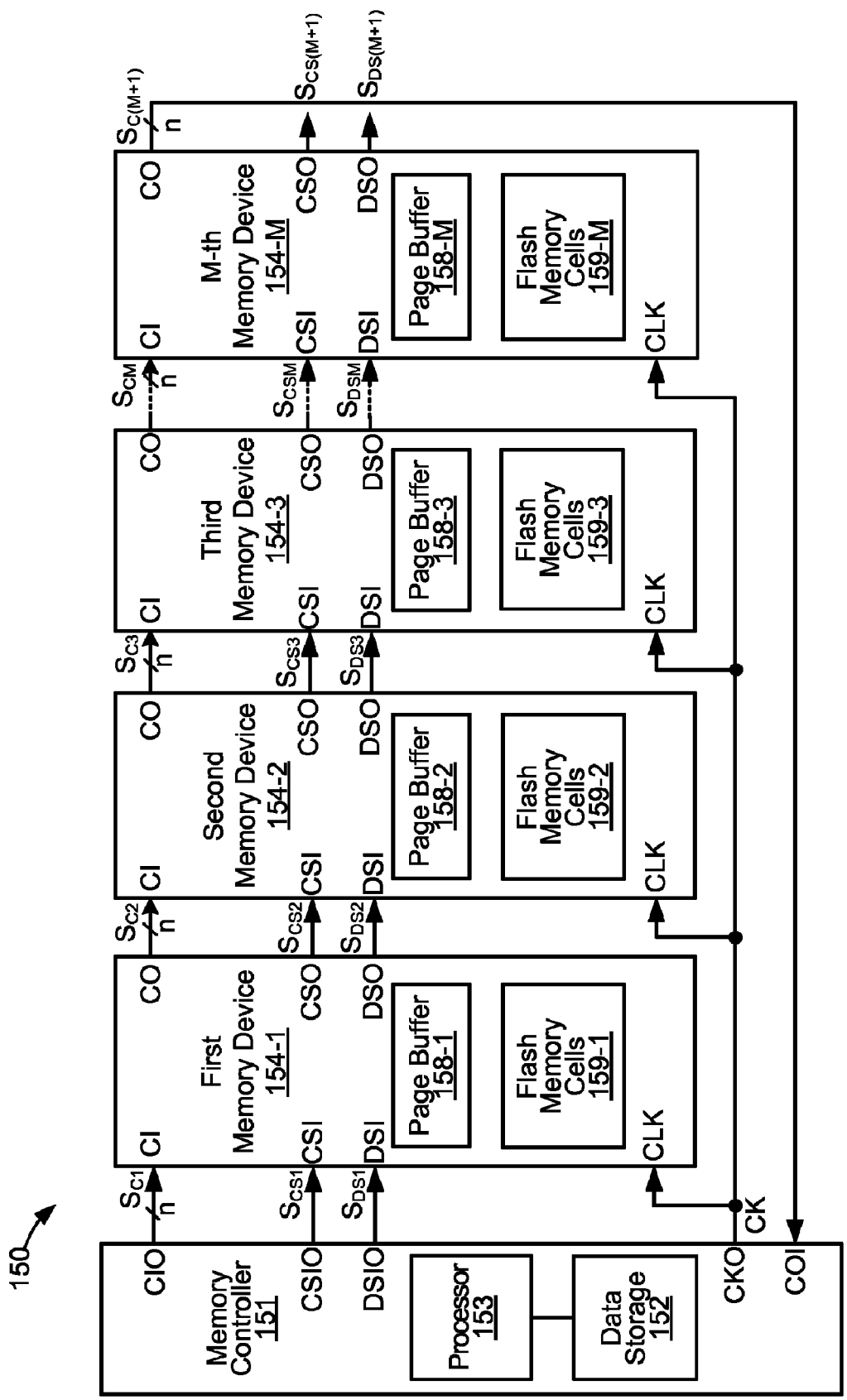
FIG. 1 is a block diagram of an example system having an architecture featuring devices connected in-series to which embodiments of the present invention are applicable.

FIG. 1 shows a system according to an embodiment of the present invention. Referring to FIG. 1, a system 150 includes a memory controller 151 and a serial interconnection of a plurality (M) of memory devices 154-1, 154-2, 154-3, . . . , and 154-M that are connected in-series, M being an integer greater than one. The memory controller 151 and the memory devices are interconnected via links having data width n, where n is an integer greater than or equal to one. In a case of n being one, the interconnection link will be a serial link and in a case of n being more than one, the interconnection link will be a parallel link. The memory controller 151 is connected to the first memory device 154-1 of the serial interconnection. The last memory device 154-M is also connected to the memory controller 151 so that first, second, third, . . . , and M-th memory devices 154-1, 154-2, 154-3, . . . , and 154-M of the serial interconnection together with the memory controller 151 form a ring connection structure. In the illustrated example, the memory devices 154-1-154-M are flash memory devices. Subsequent examples are also specific to flash memory. However, it is to be understood that embodiments of the present invention are also applicable to other types of non-volatile memory devices.

In the particular example shown in FIG. 1, each of the series-connected memory devices 154-1-154-M is a flash memory device, such as, for example, a NAND flash device. The flash memory device has a page buffer for temporary storing information on data. The stored information is written into flash memory cells of the device in accordance with page programming. Once programmed, the information stored in the page buffer is corrupted due to the verification process of the programmed cells.

The memory controller 151 has a data storage 152 and a processor 153. The data storage 152 stores various data that includes information on operation instructions, addresses and memory data to be processed and to be stored in the series-connected memory devices. The information on operation instructions is used for controlling the series-connected memory devices. The data storage 152 is, for example, a static random access memory (SRAM) or any type of embedded memory. More generally, any appropriate data storage may be implemented. The processor 153 performs operations of data processing and controlling of the memory devices accessing the data stored in the data storage 152. The memory controller 151 has a plurality of connections: a command signal output connection CIO, a command signal input connection COI, an input strobe connection CSIO, an output strobe connection DSIO and a clock output connection CKO.

In operation, the memory controller 151 sends a command input (CI) signal $S_{C1}$ through the command signal output connection CIO to the first device 154-1 and receives a command output (CO) signal $S_{C(M+1)}$ from the last device 154-M of the serial interconnection, through the command signal input connection COI. Also, the memory controller 151 provides a command strobe input (CSI) signal $S_{CS1}$ through the input strobe connection CSIO and a data strobe input (DSI) signal $S_{DS1}$ through the output strobe connection DSIO to the first device 154-1. Furthermore, the memory controller 151 provides a clock signal CK through the clock output connection CKO to all of the devices 154-1-154-M in a common clock source fashion.

The memory devices 154-1, 154-2, 154-3, . . . , and 154-M have page buffers 158-1, 158-2, 158-3, . . . , and 158-M, respectively, and flash memory cells 159-1, 159-2, 159-3, . . . , and 159-M, respectively. Each of the memory devices 154-1-154-M has a signal input connection CI for receiving the CI signal $S_{Ci}$ (i=1 to M) from a previous device; a signal output connection CO for providing the CI signal $S_{C(i+1)}$ to a succeeding device; an input strobe input connection CSI for receiving the CSI signal $S_{CSi}$ from a previous device; an input strobe output connection CSO for sending an output CSI signal $S_{CS(i+1)}$ to the succeeding device; an output strobe input connection DSI for receiving the DSI signal $S_{DSi}$ from the previous device; and an output strobe output connection DSO for sending an output DSI signal $S_{DS(i+1)}$ to the succeeding device.

Each of the memory devices 154-1-154-M has a unique device address (DA) that is hard wired or pre-assigned, so that one device can be selected or designated at a time in normal operation. Example details of an architecture featuring devices connected in-series are provided in U.S. patent application Ser. No. 11/594,564 entitled "Daisy Chain Cascading Devices" filed Jul. 31, 2006, the disclosure of which is hereby incorporated by reference in its entirety. Other example details of an architecture feature devices connected in-series are provided in U.S. Provisional Patent Application Ser. No. 60/868,773 entitled "System and Method of Operating Memory Devices of Varying Type" filed Dec. 6, 2006, the disclosure of which is hereby incorporated by reference in its entirety. Examples of the device address assignment in a plurality of memory devices that are connected in-series are provided in U.S. Provisional Patent Application No. 60/787,710, filed Mar. 28, 2006; U.S. patent application Ser. No. 11/521,734 filed Sep. 15, 2006; U.S. Provisional Patent Application No. 60/802,645, filed May 23, 2006; and U.S. patent application Ser. No. 11/750,649 filed May 18, 2007, the disclosures of which are incorporated by reference in their entirety.

In the normal operation, the memory controller 151 sends the CI signal $S_{C1}$ containing commands. A command includes a device address (DA) and an operation code (hereinafter OP code) representing an operation instruction. Some commands additionally include address information, and some commands additionally include data. Each OP code is associated with a respective operation. Each command is also referred to herein as having a type that is associated with the OP code contained in the command. For example, a command containing a read OP code is referred to as a "read command". Each of the memory devices 154-1-154-M receives commands via its respective CI either directly from the memory controller in the case that a given device is the memory device connected directly to the memory controller (device 154-1 in the illustrated example), or from an adjacent preceding memory device for other devices. Each of the memory devices 154-1-154-M uses its respective CO for forwarding on commands either to the memory controller 151 in the case that a given device is the one having its output connected to the memory controller (device 154-M in the illustrated example), or to an adjacent following device. A command containing a write OP code addressed to a particular flash memory device results in data being written to a page buffer of that device, and then transferred from the page buffer to the flash memory cells of the memory device. A command containing a read OP code addressed to a particular flash memory device results in data being read from the flash memory cells of the memory device to the page buffer of the memory device and then being transferred out of the page buffer.

The memory controller 151 issues commands, each of which include a device address (DA), a command operation code (hereinafter OP code). Some commands may additionally include address information, and some commands may additionally include data. Each OP code is associated with a respective operation. Each command is also referred to herein as having a type that is associated with the OP code contained in the command. For example, a command containing a read OP code may be referred to as a "read command". For example, commands for use in the series-connected devices are flexible modular commands, the structure of which is shown in Table I:

TABLE I

| DA | OP Code | RA | CA | DATA |
|---|---|---|---|---|
| 1 byte | 1 byte | 3 bytes | 2 bytes | 1-2112 bytes |

In Table I, DA is a device address; OP code is an operation code; RA is a row address; CA is a column address; and DATA is write data. Examples of commands associated with OP codes are a "burst data load" command and a "burst data read" command. There are cases of: (i) either of row address or column address; (ii) neither row address nor column address; (iii) no data.

Figure 2:
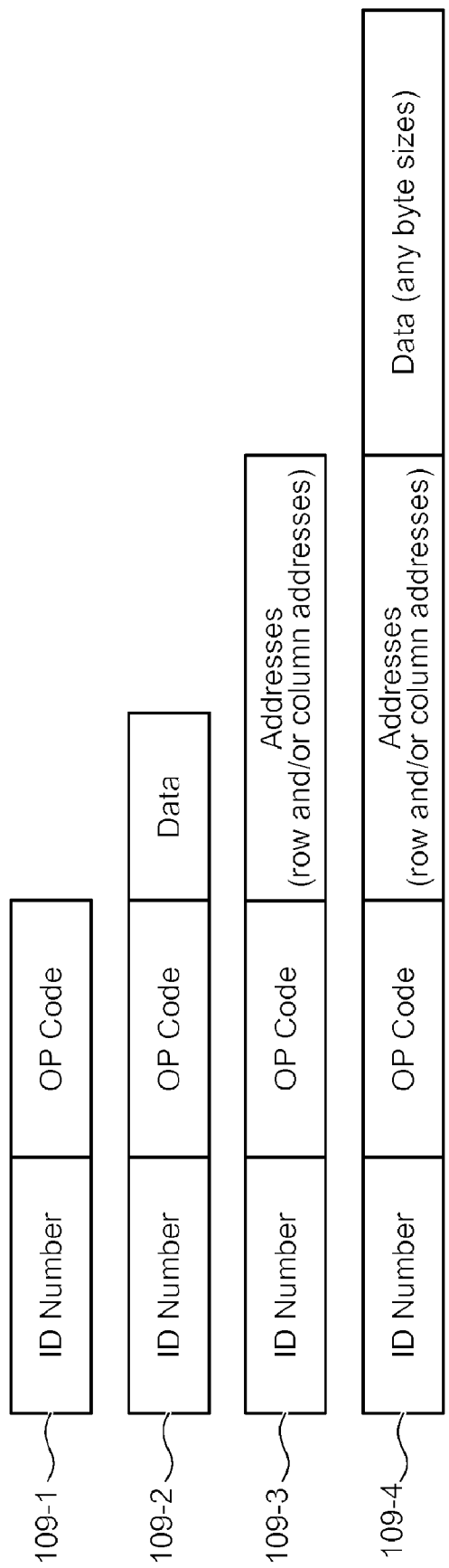
FIG. 2 is a schematic of example command formats for the memory devices connected in-series.

FIG. 2 is a schematic of example command formats for the memory devices interconnected in-series. Referring now to FIG. 2, a first command format 109-1 includes an ID number and an OP code. The ID number is used to uniquely identify a selected memory device, while the OP code field contains the OP code to be executed by the selected device. Commands with the first command format 109-1 may for example be used for commands containing OP codes for reading a register value. A second command format 109-2 includes an ID number, an OP code and data. Commands with the second command format 109-2 may for example be used for commands containing OP codes for writing data to a register. A third command format 109-3 includes an ID number, an OP code, and additional addresses. The additional addresses may for example include row and/or column addresses for addressing a location in memory cells. Commands with the third command format 109-3 may for example be used for commands containing OP codes for reading data from memory cells of a selected memory device. A fourth command format 109-4 includes an ID number, an OP code, additional addresses, and data. Commands with the fourth command format 109-4 may for example be used for commands containing OP codes for writing data to the memory cells of a selected memory device. Note that all four example command formats 109-1, 109-2, 109-3, 109-4 start with an ID number for addressing purposes. It should be understood from the foregoing that the term "command" as used herein does not merely refer to a command OP code, as a command may include an ID number, an OP code, additional addresses, data, or any other information relating to the control of an arrangement of memory devices interconnected in-series.

A particular example of the above-referenced command structures are taught in commonly assigned and co-pending U.S. patent application Ser. No. 11/840,692 filed on Aug. 17, 2007 and U.S. Provisional Patent Application No. 60/892,705 filed on Mar. 2, 2007, the contents of which are hereby incorporated by reference in their entirety. The applications disclose different command structures to distinguish core access operations that involve relatively long processing times from page buffer access operations that involve relatively short access times. Further details of the modular command structure are provided below under the heading "Modular Command Structure".

Referring back to FIG. 1, each of the memory devices 154-1, 154-2, 154-3, ..., and 154-M receives commands via its respective CI either directly from the memory controller in the case that a given device is the memory device connected directly to the memory controller (device 154-1 in the illustrated example), or from an adjacent preceding device for other devices. Each memory device uses its respective CO for forwarding on commands either to the memory controller in the case that a given device is the one having its output connected to the memory controller (device 154-M in the illustrated example), or to an adjacent following device. With conventional command structures, a command containing a read OP code addressed to a particular flash memory device results in data being read from the flash memory cells of the memory device to the page buffer of the memory device and then being transferred out of the page buffer. A command containing a write OP code addressed to a particular a flash memory device results in data being written to a page buffer of that device, and then transferred from the page buffer to the flash memory cells of the memory device.

Figure 3:
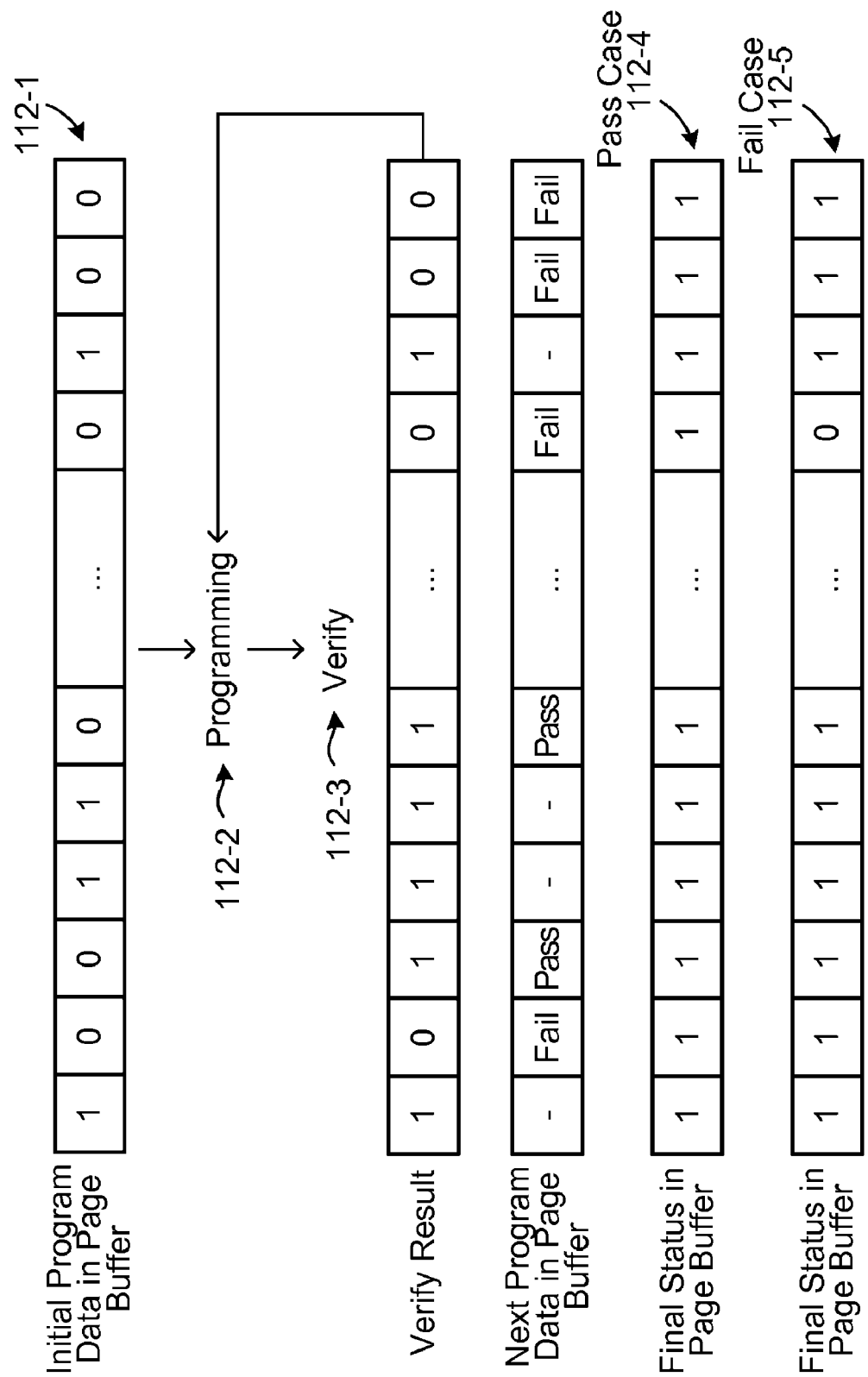
FIG. 3 is a schematic of an example procedure for page programming and verification.

FIG. 3 shows an example procedure for page programming and verification. Referring to FIGS. 1-3, an example of how a write operation is performed will be described. It is assumed that data is to be written to the memory device 154-2. Data to be programmed (e.g., 100110...0100) is loaded into the page buffer 158 of memory device 154-2 from storage elements 152 of the memory controller 151 (step 112-1). Programming of the data into in an assigned row address (page direction) of the flash memory commences (step 112-2). The programming result is verified (step 112-3). A verify result is produced in the page buffer that overwrites the page buffer contents that were written to the flash memory core with '1' states indicating pass and '0' states indicating failure. The programming operation may not pass because of defects on memory cells, wearing out of cell gate oxide or other defects. Internally, program and verify operations are performed several times for a specified period that is called a program time. As indicated at 112-4, the final contents of the page buffer 158 become all '1' states if all cells of the selected row (page direction) are programmed correctly. After the program time, if any '0' value in the page buffer 158 of device 154-2 still exists, then the page program has failed as indicated at 112-5. In the event of failure, the data is re-loaded from the storage elements 152 of the memory controller 151 to resume the page program operation to a different row address (page direction) of the same selected device.

In general, flash memories have a fundamental limitation of long program time due to cell characteristics and time used to verify the program status. Because of the fail probability of the page program operation, the data storage elements 152 of the memory controller 151 hold the initial program data in order to allow the recovery of the original program data in the event of program failure. The result is that the initial program data occupies space in the data storage elements 151 thereby preventing the space from being used for other purposes. It may result in having to wait until the page program operation and verification has completed before performing other page program operations. A possible approach to improving performance may be to increase the capacity of the storage elements in the memory controller, but this can be costly.

In the example system 150 shown in FIG. 1, when performing a page program operation with a selected memory device, the memory controller 151 loads the data into the page buffer 158 of the selected memory device and also into the page buffer of another memory device in order to store a back-up copy of the data. In this example, it is assumed that the selected memory device is the first memory device 154-1 and the other memory device is the second memory device 154-2. More generally, the selected memory device and the other memory device may be any two of the memory devices 154-1, 154-2, 154-3, ..., and 154-M. In the event that the data is not successfully programmed into the memory cells of the selected memory device 154-1, then the memory controller 151 recovers the data from the page buffer 158 of the second memory device 154-2. The page buffer 158 of the second memory device 154-2 is accessed independently of the program operation. This allows the data to be recovered without having to program the data into the memory cells of the second memory device 154-2. Since a copy of the data is stored in the page buffer 158 of the second memory device 154-2, the memory controller 151 does not need to locally store the data in its data storage elements 152. Therefore, the memory controller 151 can free up space in its data storage elements 152 where the data is stored before determining whether the data has been successfully programmed into the memory cells of the selected memory device 154-1.

In the particular example, for the purpose of allowing the page buffers to operate as a mirror back-up, in accordance with an embodiment of the invention, three "modular" memory device access commands are used. The first is referred to as a "burst data load" command and contains a burst data load OP code. This causes data to be written to the page buffer, but this command alone does not cause the data to be transferred to the flash memory cells. In the examples that follow, 4Xh and 5Xh are used for this, but more generally the command structure would be defined on an implementation specific basis. The second is referred to as a "burst data read" command and contains a burst data read OP code. This causes data to be read directly from the page buffer without first reading from the flash memory cells. In the examples that follow, 2Xh is used for this, but more generally, the command structure would be defined on an implementation specific basis. The third is referred to as a "page program" command and contains a page program OP code. This causes data that was previously stored in the page buffer to be written to the flash memory, destroying the contents of the page buffer in the process for verification purposes. In the examples that follow, 6Xh is used for this, but more generally, the command structure would be defined on an implementation specific basis.

Figure 4:
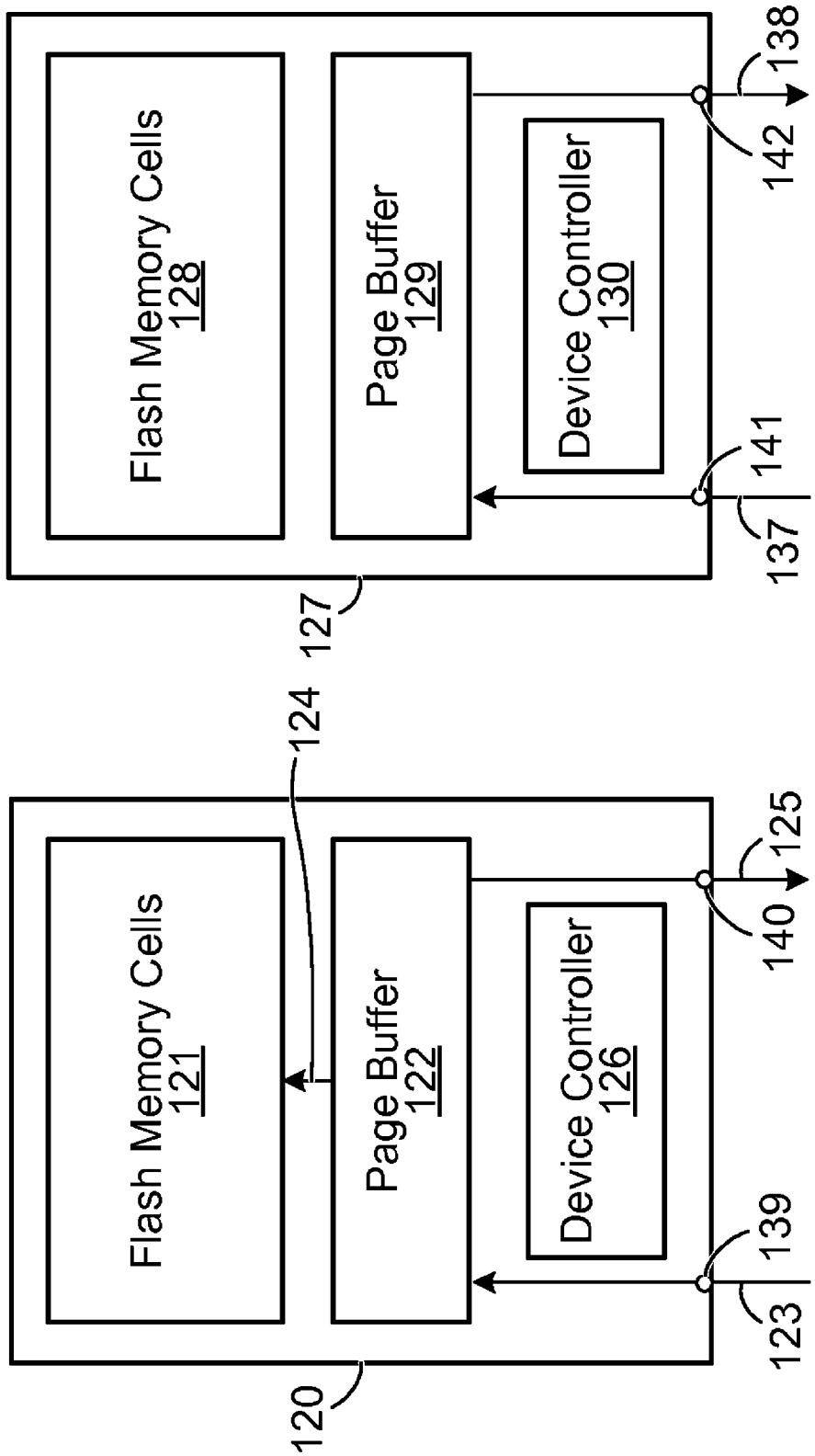
FIG. 4 is a block diagram of two memory devices, one of which is used as a mirror back-up for data.

FIG. 4 shows two memory devices shown in FIG. 1. Referring to FIGS. 1 and 4, two devices 120 and 127 represent two devices in the system 150 and two devices are adjacent to or remote from each other in the interconnection configuration. One of the two devices 120 and 127 is used as a mirror back-up for data.

The first memory device 120 has an input connection 139, an output connection 140, flash memory cells 121, a page buffer 122 and a device controller 126. Similarly, the second memory device 127 has an input connection 141, an output connection 142, flash memory cells 128, a page buffer 129 and a device controller 130. The two memory devices 120, 127 are any two memory devices that form part of an architecture featuring devices interconnected in-series. For the particular example, one of the two memory devices 120 and 127 is used as a mirror back-up for data. The device controllers 126 and 130 include any appropriate circuitry for facilitating processing of commands. Subsequent examples will not refer to any device controllers; however, it is to be understood that they would include circuitry for processing commands.

In operation, the page buffer 122 of the first memory device 120 is loaded with data by the burst data load command (4Xh and 5Xh) through the input connection 139 as indicated at 123. In this example, the data is also loaded into the page buffer 129 of the second memory device 127 through the input connection 141 as indicated at 137. Page programming within memory device 120 is accomplished by a page program command (6Xh) as indicated at 124. The page buffer 122 is read through the output connection 140 using the 'Read Device Status (D0h)' as indicated at 125 to verify whether the page programming operation was successful or not. The second memory device 127 is used as a mirror back-up for page program operation in the event that page programming is unsuccessful for the first memory device 120. A memory controller (not shown) keeps track of which memory device is being used as the mirror back-up. In the event of program failure, the data can be recovered from the mirror back-up through the output connection 142 as indicated at 138. This removes the need for the memory controller to store the contents in its storage elements. Thus, the location used by the memory controller to store the data prior to its being programmed to the page buffers 122, 129 can be freed up for other purposes.

Figure 5:
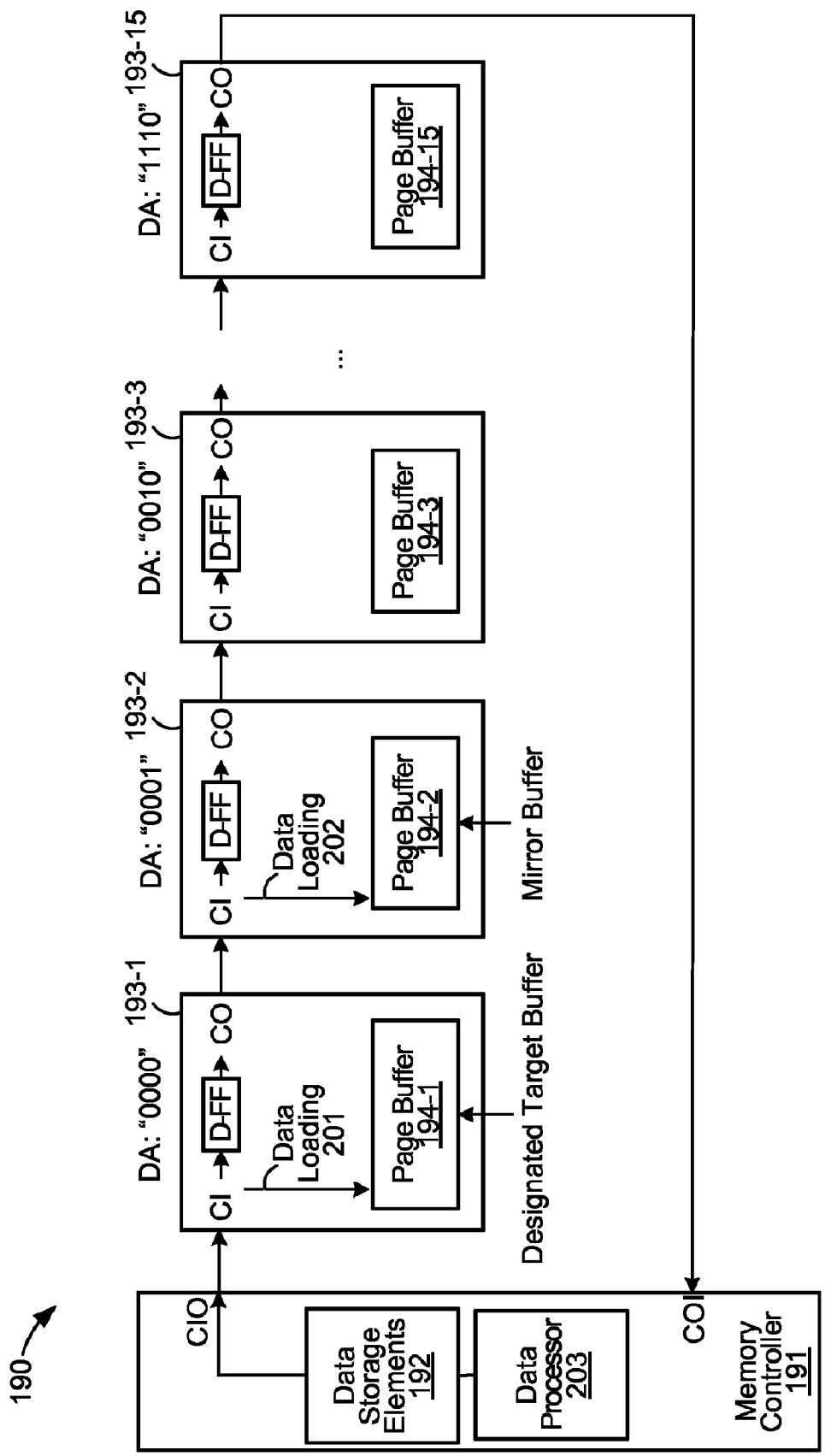
FIG. 5 is a block diagram of a system having an architecture featuring devices connected in-series in which a page buffer is used as a mirror backup for data.

The mirror function of page buffer for systems having an architecture in which devices are interconnected in-series will now be described with reference to FIGS. 5 and 6. FIG. 5 provides an example where the same data is to written to two different page buffers using two separate write commands (i.e., one for each page buffer). In another implementation, a single write command is used to write the same data to two or more page buffers. An example of this is provided below with reference to FIG. 6.

FIG. 5 shows a system having an architecture featuring devices connected in-series in which a page buffer is used as a mirror backup for data. Referring first to FIG. 5, a system 190 having a memory controller 191 and a plurality of memory devices 193-1, 193-2, 193-3, ..., and 193-15 that are connected in-series. In the particular example, the system 190 includes 15 memory devices. More generally two or more may be provided. The memory controller 191 has data storage elements 192 and a data processor 203. The memory controller 191 also has an output connection CIO for connecting with the first memory device 193-1, and an input connection COI for connecting with the last memory device 199-15. The memory devices 193-1, 193-2, 193-3, ..., and 193-15 have page buffers 194, 196, 198 and 190, respectively, and each of the memory devices 193-1, 193-2, 193-3, ..., and 193-15 has memory cells (not shown).

The memory controller 191 and the memory devices 193-1, 193-2, 193-3, ..., and 193-15 are interconnected with serial links. Other examples described herein are also specific to serial links between consecutive devices. However, it is to be understood that embodiments of the invention are also applicable to architectures featuring parallel links between consecutive devices. More generally, embodiments of the invention are applicable to architectures featuring series links between consecutive devices. The series links may be serial links, or parallel links. The system 190 uses a page buffer as a mirror backup for data. In the illustrated example, two devices are interconnected by a link having one I/O pin. Alternatively, a link can include a plurality of I/O pins. The memory devices 193-1, 193-2, 193-3, ..., and 193-15 has respective processing circuitry for processing a signal through the CI connection from a previous device and outputting processed result though the CO connection to a next device. For simplicity, such circuitry is shown by a representing D-type flip-flop (D-FF).

For this example, it is assumed that the memory controller 191 needs to write data to the memory cells of memory device 193-1, and that the page buffer 194-2 of the memory device 193-2 is available for use as a mirror backup. In operation, the memory controller 191 issues a first write command in order to load data from the data storage elements 192 into the page buffer 194-1 of the first memory device 193-1. The loading of the data into the page buffer 194-1 is generally indicated at 201. In order to keep a back-up copy of the data in the event that the page programming fails, the memory controller 191 also issues a write command (page buffer load) in order to load the same data into the page buffer 194-2 of the second memory device 193-2. The loading of the data into the page buffer 194-2 is generally indicated at 202. The memory controller 191 then issues a page program command to program the data that has been loaded into the page buffer 194-1 into the memory cells (not shown) of the first memory device 193-1. In the illustrated example, the data is not programmed into the memory cells of the second memory device 193-2. Instead, the data is maintained in the page buffer 194-1 as a mirror back-up copy of the data in case the page programming for the first memory device 193-1 fails.

The memory controller 191 keeps track of which memory device 193-2 is being used as the mirror back-up. In the event of program failure, the data can be recovered from the mirror back-up. This removes the need for the memory controller 191 to store the contents in its data storage elements 192. Therefore, as soon as the page buffer loads are done, the data storage elements 192 previously used to store the data are freed up for other uses. The memory controller keeps track of which data storage elements 192 are free, and which are in use. In the event of success in the page programming operation, the locations in the page buffer 194-2 being used as a mirror back-up are freed up.

Note that the first memory device 193-1 and the second memory device 193-2 are selected by the memory controller 191. The memory controller 191 can alternatively select different memory devices. Each write command is addressed to a target memory device by DA.

Note that for the devices connected in-series, there is a clock cycle based latency delay between memory devices to synchronize output result (CO) from input (CI). The latency can be determined according to the system and device specification. All examples assume a one clock cycle latency between input and output. Therefore, between two adjacent memory devices, there is a one cycle difference when input data is captured. However, it is to be understood that the clock cycle latency may alternatively be smaller such as a half cycle, or greater such as over two cycles. Regardless, the memory devices take input streams with the latency delay.

Figure 6:
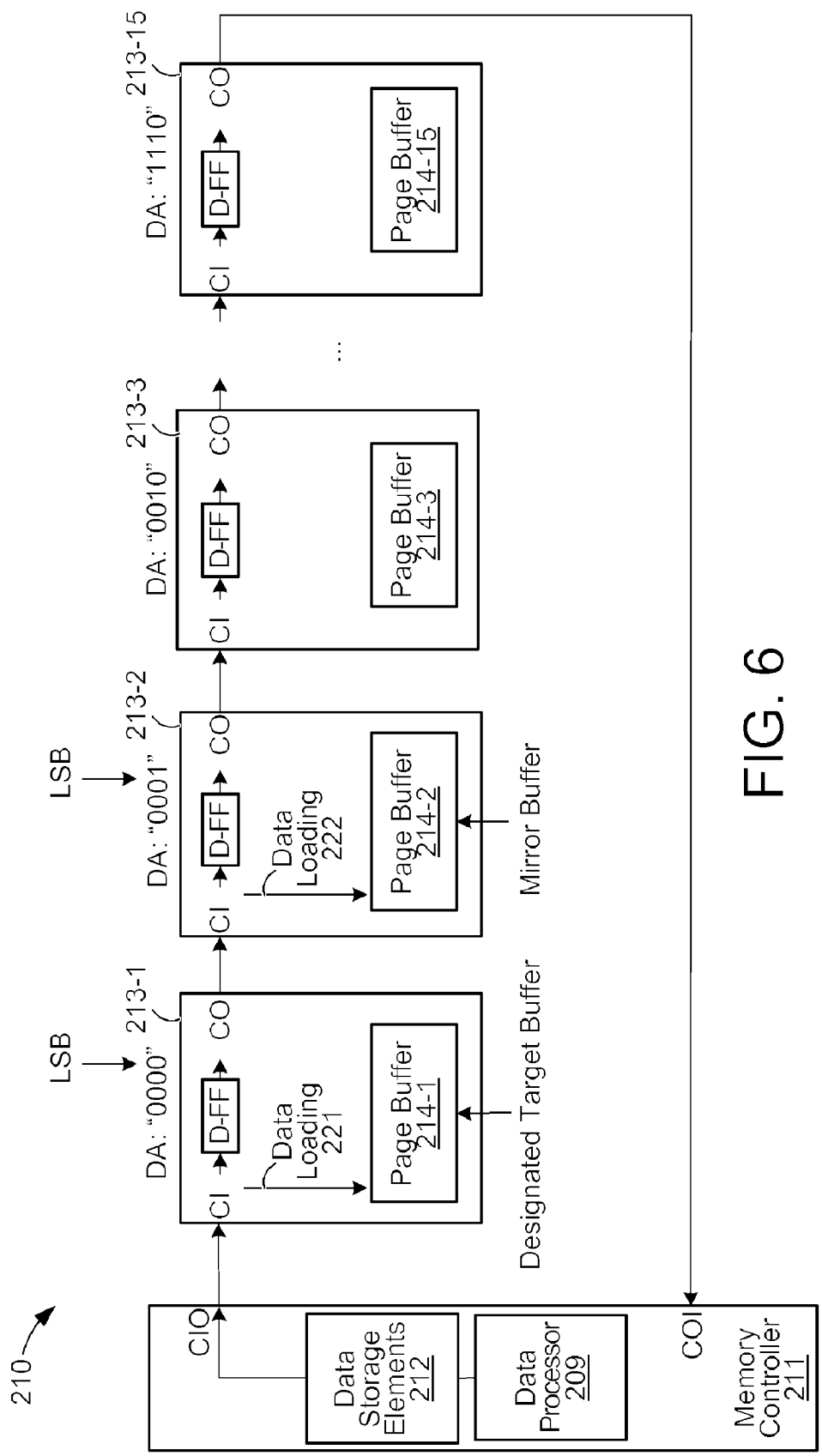
FIG. 6 is a block diagram of another system having an architecture featuring devices connected in-series in which a page buffer is used as a mirror backup for data.

FIG. 6 shows another system having an architecture featuring devices connected in-series in which a page buffer is used as a mirror backup for data. Referring to FIG. 6, a system 210 using a page buffer 214-2 as a mirror backup for data. The system 210 has a memory controller 211 and a plurality of memory devices 213-1, 213-2, 213-3, ..., and 213-15. The memory controller 211 has data storage elements 212, which is, for example, an SRAM. The memory controller 211 also has a data processor 209, an output connection CIO for connecting with the first memory device 213-1, and an input connection COI for connecting with the last memory device 213-15. The memory devices 213-1, 213-2, 213-3, ..., and 213-15 have page buffers 214-1, 214-2, 214-3, ..., and 214-15, respectively, and each of the memory devices has memory cells (not shown). The memory controller 211 and the memory devices 213-1, 213-2, 213-3, ..., and 213-15 are interconnected with links. A detailed example of mirror backup operation for the system of FIG. 6 is described further below.

In an example system, a memory device that is to function as a mirror backup for a given memory device is statically defined. A particular example of such a static definition is defined in the tables below in which it is assumed that: for a given device having an even device address, the device that is to function as a mirror backup for the given device is the device having an address one greater than that of the given device (see Table 2) and for a given device having an odd address, the device that is to function as mirror backup for the given device is the device having an address one less than that of the given memory device (see Table 3).

TABLE 2

For even device addresses, static association between Designated Target Address (DAt) and Mirror Address (MA)
defined by: MA = DAt + 1

| Designated Target Address (DAt) | Mirror Address (MA) |
|---|---|
| 0000 | 0001 |
| 0010 | 0011 |
| 0100 | 0101 |
| — | — |
| — | — |
| 1010 | 1011 |
| 1100 | 1101 |

TABLE 3

For odd device addresses, static association between Designated Target Address (DAt) and Mirror Address (MA)
defined by: MA = DAt − 1

| Designated Target Address (DAt) | Mirror Address (MA) |
|---|---|
| 0001 | 0000 |
| 0011 | 0010 |
| 0101 | 0100 |
| — | — |
| — | — |
| 1011 | 1010 |
| 1101 | 1100 |

In the examples defined by Tables 2 and 3 above, the designated target device and the mirror device share common addresses with the exception of the LSB (least significant bit). More generally, in some examples, the relationship between the designated target device and the mirror device is used to efficiently address the two devices without requiring two separate commands to be sent.

A specific example of this applies to the mirror backup device definitions in Tables 2 and 3 in which a new mode of operation referred to as "ignore LSB mode" in which all devices compare all bits of the address of each incoming command except the LSB to corresponding bits of the device's device address (namely all of the bits except the LSB). In such a mode, both a device having a given designated target address, and an appropriate mirror device will process the command. In some implementations, a command is first sent to turn on ignore LSB mode. This can be done using an address that is processed by all devices, referred to as a broadcast address. This is followed by a command to load data to the page buffer, this resulting in the data being loaded to the page buffer of both a designated target device and the mirror device. After this, ignore LSB mode is turned off again, and a command to write the contents of the page buffer of the designated target device to the core memory is sent and processed only by the designated target device. In another example, a different OP code is defined that signifies ignore LSB mode for that command. In another embodiment, ignore LSB mode is only active for at most one following command and as such, there is no need to turn off ignore LSB mode if such a command has been sent. In another embodiment, another field in a command is used to signify ignore LSB mode.

An example of this will now be described with reference to FIG. 6 where it is assumed that the memory controller 211 has determined to write data to the memory cells of memory device 213-1, while using the page buffer 214-2 of the memory device 213-2 as a mirror backup. This example differs from the example of FIG. 5 in that the memory controller 211 issues a single write command in order to load data from the data storage elements 212 to both the page buffer 214-1 of the first memory device 213-1 and the page buffer 214-2 of the second memory device 213-2. This is accomplished during an "ignore LSB mode", where the memory devices ignore the LSB of the target device address found in the single write command. In this example, the memory controller 211 sends an 'ignore LSB' command to all memory devices 213-1, 213-2, 213-3, . . . , and 213-15 of the devices connected in-series to inform them to ignore the LSB of the target device address of subsequently received commands. The ignore LSB command is, for example, a 'Write Link Configuration Register' command with an OP code of FFh that is sent to a broadcast address that is processed by all memory devices. Any appropriate structure for such a broadcast command may be used; more generally, any appropriate mechanism for enabling the ignore LSB mode can be implemented. Various examples have been provided above.

Once the ignore LSB mode is enabled, two memory devices are selected by a single target address. For example, a page buffer load command having a target address of "0000" will be processed by both the first memory device 213-1 having a device address (DA) of "0000" and the second memory device 213-2 having a device address of "0001". Note that the first and second memory devices 213-1 and 213-2 have identical device addresses with exception to the LSB. One of the two memory devices 213-1 and 213-2 (e.g., the first memory device 213-1) is used as a "designated target device", while the other memory device (e.g., the memory device 213-2) is used as a "mirror device", the page buffer of which stores mirror program data. Once the page buffer load command is issued, data loading starts. The page buffers 214-1 and 214-2 of two selected devices 213-1 and 213-2 store the data thereinto. The loading of the data into the page buffers 214-1 and 214-2 is generally indicated at 221 and 222. Prior to programming, the ignore LSB mode is reset and normal operation where only one memory device is selected at a time resumes. This is, for example, accomplished by issuing another broadcasting command. Example timing details of the enabling and disabling of the ignore LSB mode for the system 210 are provided below with reference to FIG. 7.

Figure 7:
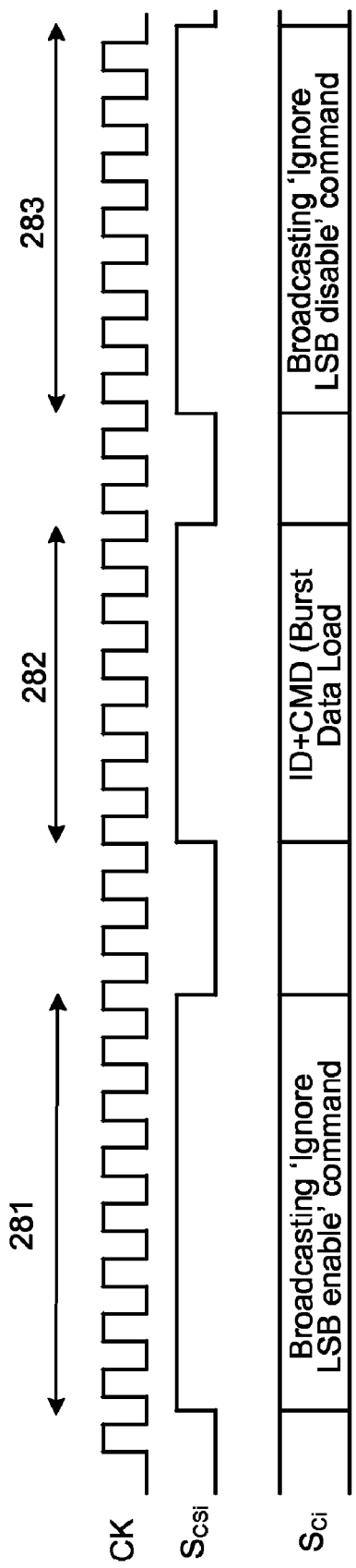
FIG. 7 is an example timing diagram of enabling and disabling of an USB (least significant bit) ignore mode for the system of FIG. 6.

FIG. 7 shows an example timing diagram of enabling and disabling of an LSB ignore mode for the system of FIG. 6. Referring to FIGS. 6 and 7, the memory controller 211 outputs three signals: a clock signal CK; a command strobe input signal CSI and a command input signal CI. Note that the CSI signal is asserted during three stages, namely, first, second and third stages.

The first stage is indicated at 281. The memory controller 211 sends an 'ignore LSB' command to inform the memory devices to ignore the LSB of the target device address of subsequently received commands. The command contains a broadcast DA and an OP code for enabling ignore LSB mode. Here is assumed that 'FF' is a broadcast address that results in all of the memory devices in the devices connected in-series accepting and processing this command.

The second stage is indicated at 282. The memory controller 211 transmits a command for loading data into the page buffers 214-1 and 214-2 of the first two memory devices 213-1 and 213-2. The command includes the device identifier (ID) for the first memory device 213-1 and the burst data load instruction (CMD). Since ignore LSB mode has been enabled, both the first and second memory devices 213-1 and 213-2 process the command and load the data into their page buffers 214-1 and 214-2.

The third stage is indicated at 283. The memory controller 211 transmits a command for disabling the ignore LSB mode. The ID is again the broadcast ID 'FF'.

Once the ignore LSB mode has been disabled, the memory controller 211 issues a page program command to program the data that has been loaded in the page buffer 214-1 into the memory cells (not shown) of the first memory device 213-1. In the illustrated example, the data is not programmed into the memory cells (not shown) of the second memory device 213-2. Instead, the data is maintained in the page buffer 214-2 of the second memory device 213-2 as a mirror back-up copy of the data in case the page programming for the first memory device 213-1 fails. The second memory device 213-2 should not be accessed for any core operations using the page buffer 214-2. However, register based commands, such as status, configuration register read or write are possible. Other memory devices 213-3, . . . , and 213-15 can be freely accessed.

Figure 8:
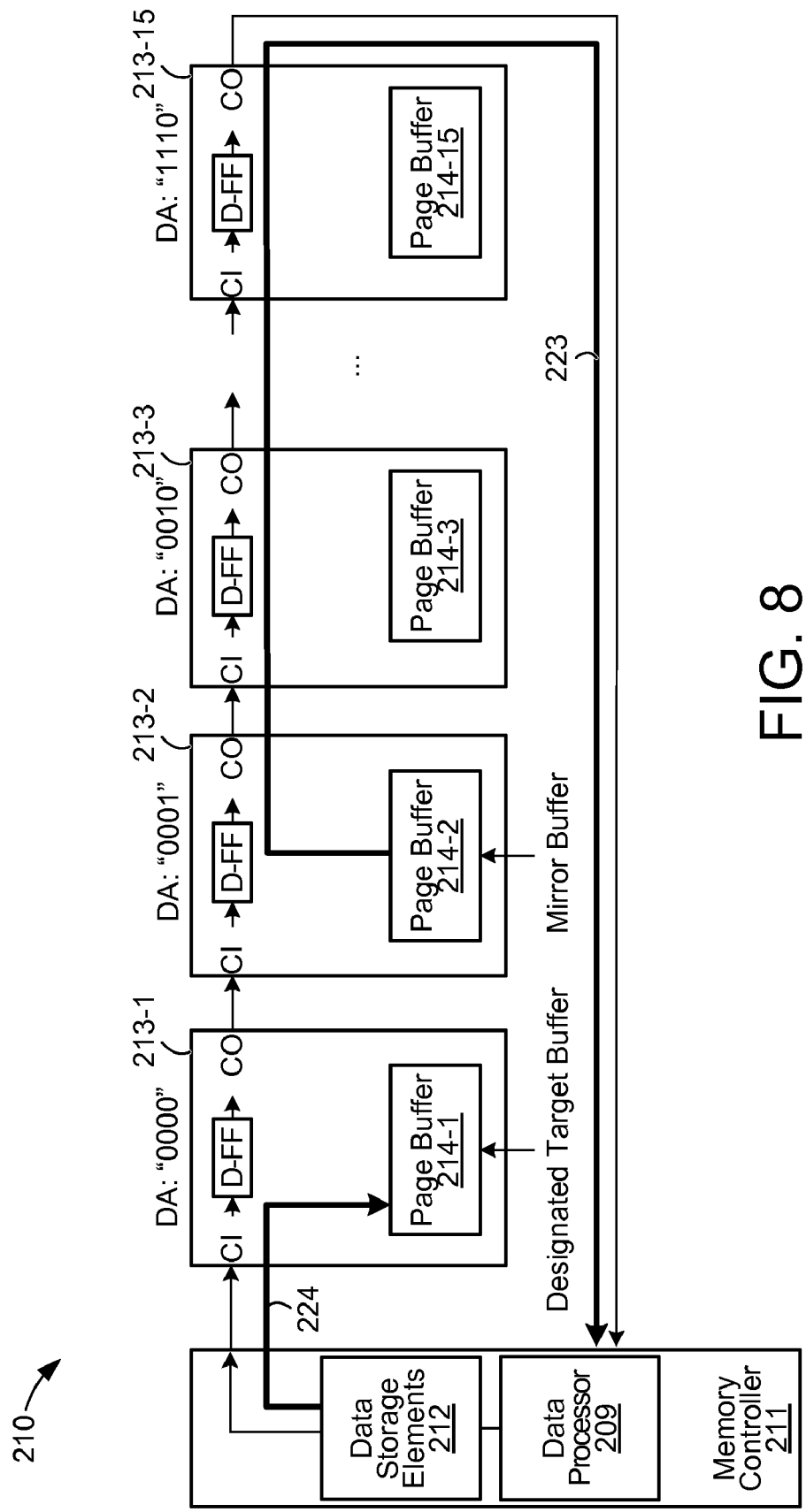
FIG. 8 is a block diagram of the system of FIG. 6 in which a data recovery is performed after program failure.

FIG. 8 shows the system 210 of FIG. 6 in which a data recovery is performed after program failure. Referring now to FIG. 8, a data path for the data recovery is generally shown at 223. At first, the program data in mirror buffer 214-2 of the second memory device 213-2 is transmitted to the data storage elements 212 of the memory controller 211 to thereby allow the memory controller 211 to recover the initial program data that may not have been kept in the data storage element 212 due to its being used for other purpose. Next, the program data recovered from the mirror buffer 214-2 is sent to a new page address by performing a page buffer load and page program. This may be to another page on the first memory device 213-1 or a page on another memory device. If it is another memory device, the process starts from scratch by reloading the data into two page buffers. Alternatively, the data loaded into the mirror buffer 214-2 can be maintained while the recovered data is loaded into the page buffer of another memory device. The memory controller 211 keeps track of, and does not use, failed pages. In the example depicted in FIG. 8, the program data recovered from the mirror buffer 214-2 is sent to the page buffer 214-1 of another memory device 213-1 as indicated at 224.

In the illustrated examples provided above, specific details of the memory devices for implementing the ignore LSB feature are not provided. It is to be understood that the memory devices can be implemented with any appropriate control circuitry for accomplishing the ignore LSB feature. A specific implementation is provided below with reference to FIGS. 9 and 10 for exemplary purposes.

Figure 9:
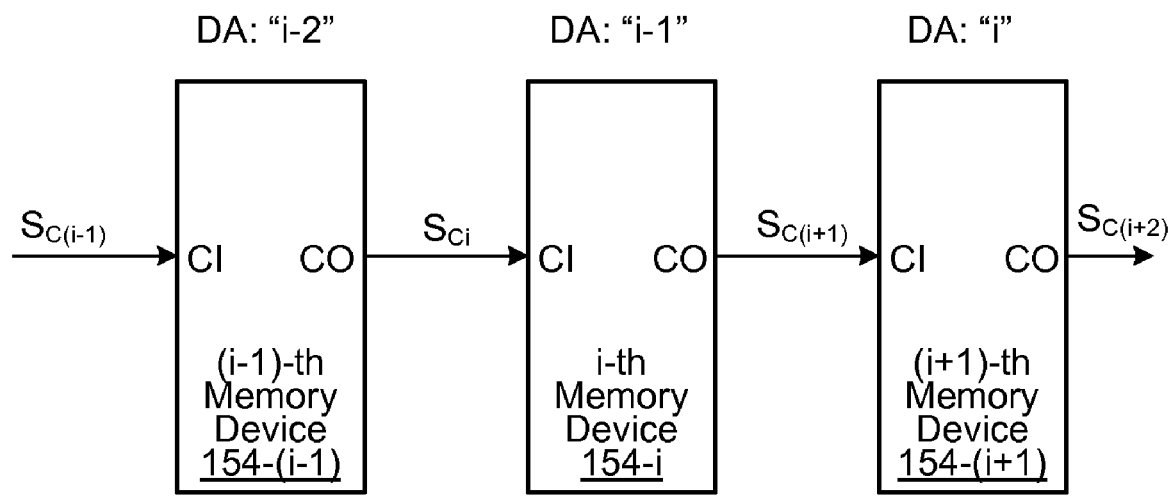
FIG. 9 is a block diagram showing part of the series-connected memory devices shown in FIG. 1.

FIG. 9 shows part of the series-connected memory devices shown in FIG. 1. As shown, command input signal $S_{Ci}$ input to a device 154-$i$ from a previous device 154-($i$−1) can be transmitted to the next device 154-($i$+1).

Figure 10:
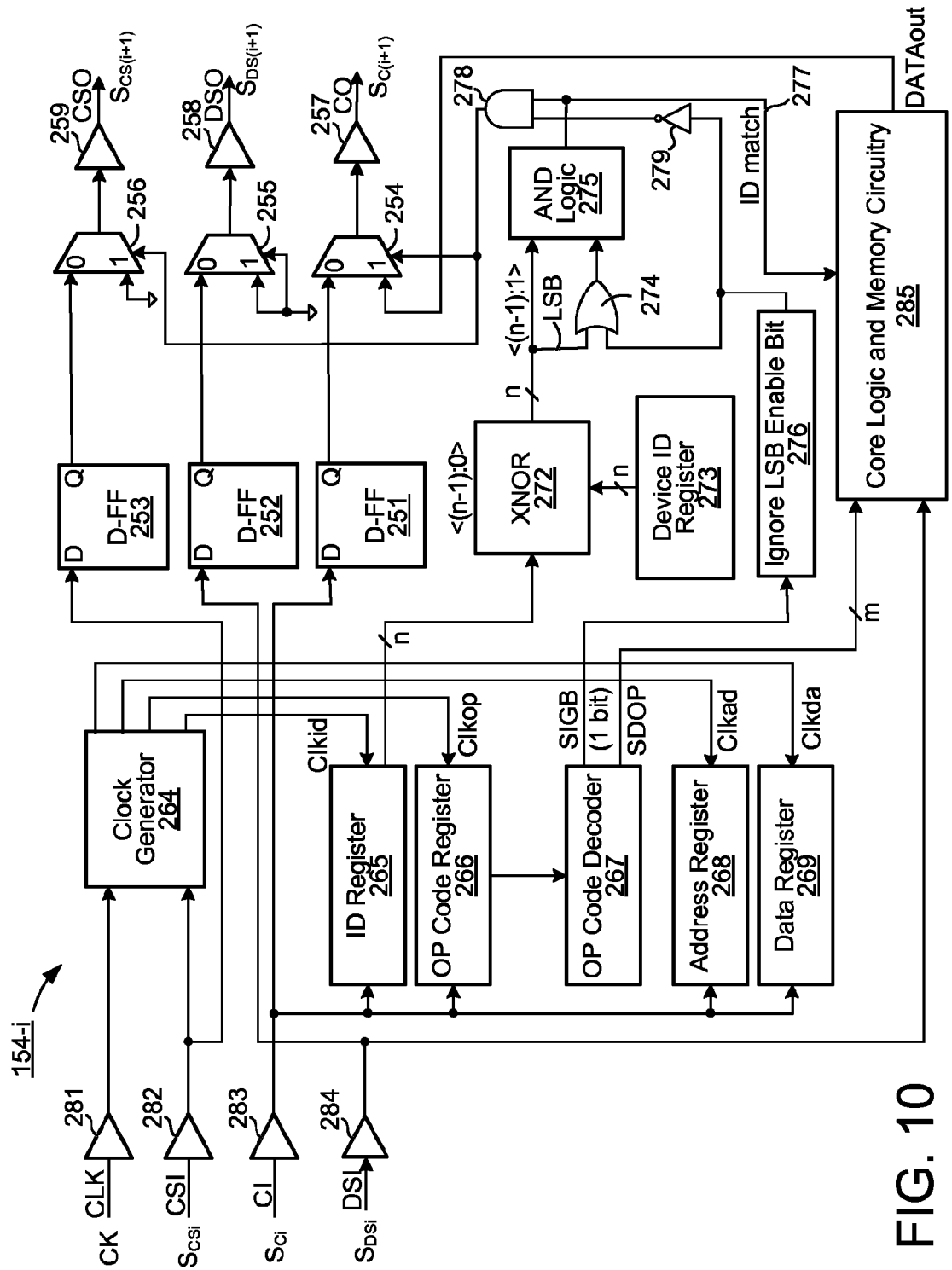
FIG. 10 is a schematic of example circuitry of a memory device shown in FIG. 9.

FIG. 10 shows memory device circuitry for use in a memory device of the devices connected in-series. The memory device circuitry implements the Ignore LSB feature. Referring to FIG. 10, a memory device 154-$i$ has a plurality of inputs including a clock input CLK for receiving the clock signal CK, a command strobe input CSI for receiving the command strobe signal $S_{CSi}$, a data strobe input DSI for receiving the data strobe signal $S_{DSi}$ and a command input CI for receiving the command input signal $S_{Ci}$. The memory device 154-$i$ has a plurality of outputs including a command strobe output CSO for outputting the command strobe signal $S_{CS(i+1)}$, a data strobe output DSO for outputting the data strobe signal $S_{DS(i+1)}$ and the command output CO for outputting the command input signal $S_{C(i+1)}$ to the next device 154-($i$+1).

The clock signal CK, the command strobe signal $S_{CSi}$, the command input signal $S_{Ci}$ and the data strobe signal $S_{DSi}$ are buffered by respective input buffers 281, 282, 283 and 284. The buffered clock signal and command input signal are fed to a clock generator 264 which outputs internally generated clock signals: an ID clock signal Clkid, an OP code clock signal Clkop, an address clock signal Clkad and a data clock signal Clkda. The ID clock signal Clkid, the OP code clock signal Clkop, the address clock signal Clkad and the data clock signal Clkda are fed to an ID register 265, an OP code register 266, an address register 268 and a data register 269. The appropriate fields of the command of the command input signal $S_{Ci}$ are input to the ID register 265, the OP code register 266, the address register 268 and the data register 269 in response to the respective clock signals. The OP code held in the OP code register 266 is fed to the OP code decoder 267 for decoding. The OP code decoder 267 outputs one-bit signal SIGB to a one-bit register 276 and a multi-bit (m-bits: e.g., three-bit) decoded OP code signal SDOP to core logic and memory circuitry 285. The core logic and memory circuitry 285 also receives the buffered data strobe signal.

The command input signal $S_{Ci}$ is latched by a D-FF 251, the output of which is buffered again to produce command input signal $S_{C(i+1)}$ to be forwarded on to the next memory device 154-($i$+1).

The memory device 154-$i$ includes exclusive NOR (XNOR) logic circuitry 272 that receives as input the n-bit output of the ID register 265 and n-bit contents of a device ID register 273 for holding a value of the device address (DA). The XNOR logic circuitry 272 has n XNOR gates that perform bitwidth XNOR operation between the n-bit output of the ID register 265 and the n-bit contents of the device ID register 273 and produces an n-bit output. The LSB of the n-bit output the XNOR logic circuitry 272 is input to one input of an OR gate 274, and the remaining bits of the n-bit output of the XNOR logic circuitry 272 are input to AND logic circuitry 275. The one-bit register 276 is provided for registering the "ignore LSB enable bit" (in the signal SIGB) from the OP code decoder 267. The output of the one-bit register 276 is input as a second input to the OR gate 274, and the output of the OR gate 274 is fed as another input to the AND logic circuitry 275. The operation of these components is described below.

In operation, the memory device 154-$i$ receives a command in the command input signal $S_{Ci}$. Based on the timing of the command strobe signal $S_{CSi}$ together with the clock signal CK, the clock generator 264 generates internal clock signals for appropriately latching the contents of the command to the appropriate registers. More specifically, the ID register 265 registers the ID of the command. The OP code register 266 registers the OP code. The address register 268 registers the column/row addresses. The data register 269 registers any data included in the command. In addition, the OP code decoder 267 receives the command registered in the OP code register 266 and decodes it. The buffered clock signal is provided to D-FFs in the circuitry (clock signal paths are not shown).

In the event the command is either a command containing a broadcast DA, or a command addressed to the specific device, the OP code is decoded and processed by the device. With the broadcast DA, all devices are to be asserted and ready to receive a command. Upon receipt of a command to enter the ignore LSB mode as determined by the OP code decoder 266, the one-bit register 276 is set and thus, the "ignore LSB enable bit" is set to enable LSB ignore mode.

The ID register 265 outputs the registered DA, which is the target DA, in parallel as n-bit data. The XNOR logic circuitry 272 compares the target DA (that is represented by the ID number contained in the command) with the device ID held in the device ID register 273 on a bit for bit basis. If the target DA and the device ID are identical, then the output of the XNOR logic circuitry 272 will be all '1's. The LSB of the comparison is fed into the OR gate 274, while the other bits are fed into the AND logic circuitry 275. The LSB of the comparison being "high" is sufficient for the OR gate 274 to have a "high" output. The OR gate 274 is also fed with the "ignore LSB enable bit" of the one-bit register 276. The "ignore LSB enable bit" of the one-bit register 276 being "high" is also sufficient for the OR gate 274 to have a "high" output. Therefore, if the "ignore LSB enable bit" of the one-bit register 276 is high, then it does not matter whether the LSB of the target DA matches the LSB of the device ID. Rather, the non-LSB bits matter. The AND logic circuitry 275 outputs an ID match signal 277 that indicates whether there is a match between the target DA and the device ID. This will be true if all of the n inputs to the AND logic are high. During ignore LSB mode, this will be true if other (n−1) bits except for the LSB match during the ignore LSB mode. When not in ignore LSB mode, this will be true if all n bits match. The ID match signal 277 from the AND logic circuitry 275 determines whether the memory device 154-$i$ executes the command. Upon receipt of a command to exit the ignore LSB mode, the one-bit register 276 is cleared. The ID match signal 277 is provided to the core logic and memory circuitry 285 and an AND gate 278. The output of the one-bit register 276 is input to an inverter 279, the inverted output signal of which is provided to the AND gate 278, the AND logic output signal of which is fed to multiplexers 254 and 256.

When there is no match between the target DA and the device ID, the ID match signal ID match signal 277 is "low" and the multiplexer 254 is selected to its "0" input. Therefore, the latched command input signal is provided as the command input signal SC(i+1) to the next device 154-(i+1). Also, the latched command strobe signal is provided through the multiplexer 256 as the command strobe signal SCS(i+1) to the next device 154-(i+1). Thus, there is no ID match, the device 154-1 is not the target device and the command input signal SCi and the command strobe signal SCSi are forwarded to the next device 154-(i+1). If the data strobe signal is input (e.g., in the data read mode operation), the latched data strobe signal is provided through the multiplexer 255 as the data strobe signal SDS(i+1) to the next device 154-(i+1), regardless of the status of the ID match signal ID match signal 277. With no ID match, the core logic and memory circuitry 285 is not activated.

When there is a match between the target DA and the device ID during ignore LSB mode (i.e., the output of the one-bit register 276 is "high"), the ID match signal 277 is "high", the core logic and memory circuitry 285 is activated. However, the output signal of the inverter 279 is "low" and the "0" inputs of the multiplexers 254 and 256 are selected. The input signal is provided as the command input signal $S_{C(i+1)}$ to the next device 154-(i+1). Also, the command strobe signal is provided as the command strobe signal $S_{CS(i+1)}$ to the next device 154-(i+1).

When there is a match between the target DA and the device ID during non-ignore LSB mode (i.e., the output of the one-bit register 276 is "low"), the ID match signal 277 is "high", the core logic and memory circuitry 285 is activated and the decoded OP code of the decoded signal SDOP from the OP code decoder 267 is executed to operate in accordance with the command instruction. The output signal of the inverter 279 is "high" and the AND logic output signal of the AND gate 278 is "high". The "1" inputs of the multiplexers 254 and 256 are selected. If the instruction is a data read, the core logic and memory circuitry 285 executes the read command and in accordance with the addresses of row and/or column, data is read from the memory therein (not shown). The output data DATAout from the core logic and memory circuitry 285 is provided as the command input signal $S_{C(i+1)}$ to the next device 154-(i+1).

The examples presented above show how two memory devices can process a single command when they have identical device addresses with exception to the least significant bit. This is accomplished while the memory devices are in an ignore LSB mode. More generally, embodiments of the invention allow for two or more memory devices to process a single command based on the target address of the single command. For example, in another embodiment, the memory devices enter a multi-address detection mode. This may occur for example if the memory controller broadcasts a first message instructing each memory device to enter the multi-address detection mode. While in the multi-address detection mode, upon receiving a command having a destination address that differs from the device address, the memory device conditionally processes the command based on the destination address. At some later time, the memory devices exit the multi-address detection mode. This may occur for example if the memory controller broadcasts a second message instructing each memory device to exit the multi-address detection mode. The messages broadcasted for entering and exiting the multi-address detection mode are, for example, a write link configuration register command comprising an op-code of FFh.

There are many ways for a memory device to conditionally process the command based on the destination address. In some implementations, the memory device maintains an identification of an alternative device address. If the target device address of the received command matches the alternative device address, then the memory device processes the command. In other implementations, the memory device conditionally processes the command if the destination address differs from the device address in a predefined manner. For example, the memory device processes the command if the destination address differs from the device address only by a single predefined bit. The single predefined bit can be the least significant bit, examples of which have been provided above. Alternatively, the single predefined bit is some other bit.

Figure 11:
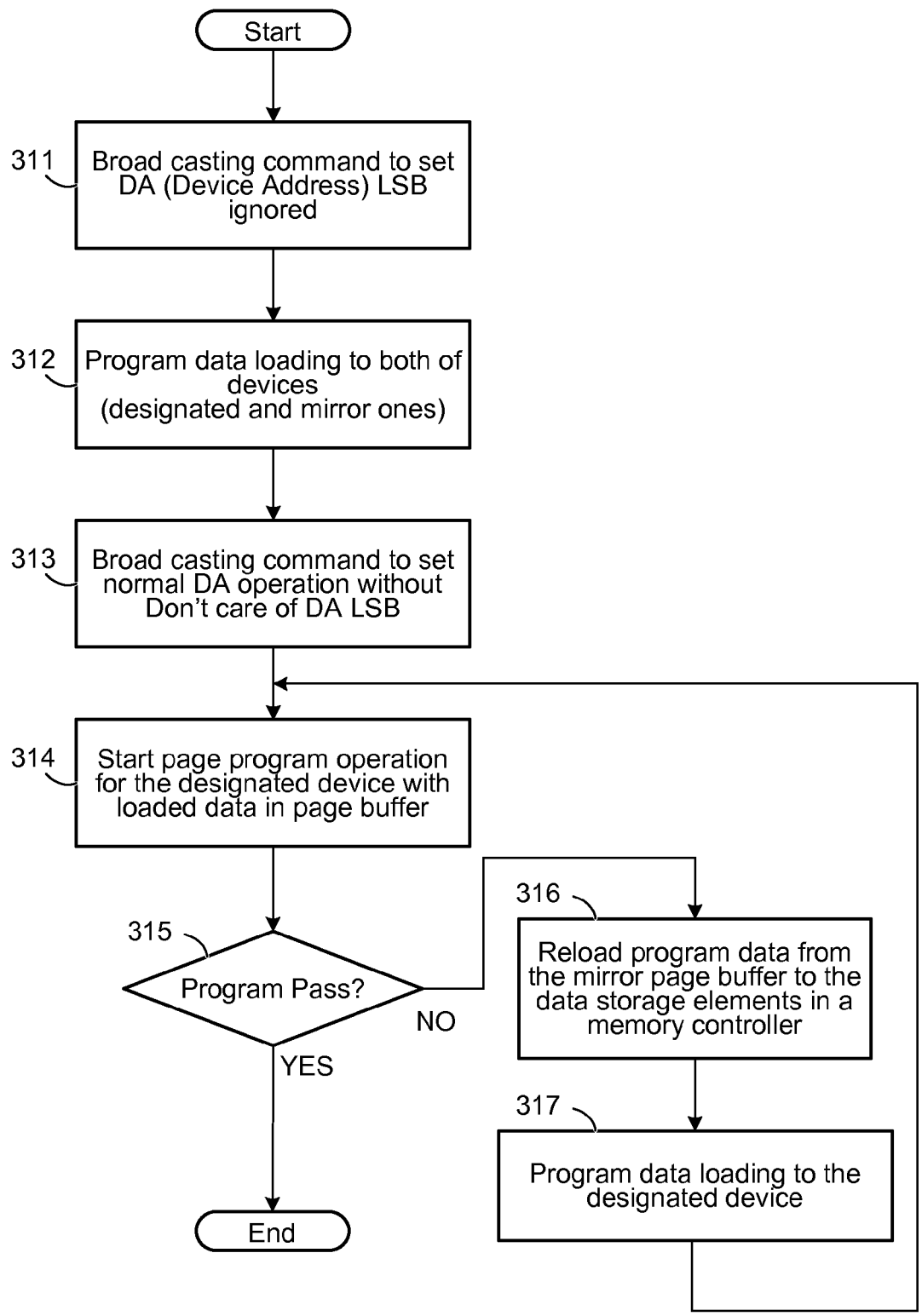
FIG. 11 is a flowchart of a method of program operation with a mirror back-up.

FIG. 11 shows a method of program operation with a mirror back-up. This method can be implemented by a memory controller, for example by the memory controller 211 shown in FIG. 6.

Referring to FIGS. 6 and 11, at step 311 the memory controller 211 sends an "ignore LSB" command to all memory devices 213-1, 213-2, 213-3, . . . , and 213-15 connected in-series to inform them to ignore the LSB of the target device address to be received. In step 312, the memory controller 211 sends a target device address as part of a command to write to the page buffer. In a particular example, assume that the target device address is '0000', namely the device address of device 213-1 of FIG. 6. With that address, both devices 213-1 and 213-2 will process the command while in ignore LSB mode. More generally, for a given target device address, two of the devices will process the command. The command to write to the page buffer includes data to be written. With device address matching, the data is latched by both memory device 213-1 and memory device 213-2. Thus, the transmitted data is loaded into the page buffers of both devices only (step 312). This is accomplished using a single command.

Subsequently, the memory controller 211 sends a "normal DA set" command to all memory devices 213-1, 213-2, 213-3, . . . , and 213-15 to inform them to no longer ignore the LSB of the target device address found in received commands (step 313). Then, the memory controller 211 starts page programming for the designated device by sending a page program addressed to that device (step 314). If the memory controller 211 determines that the page programming is successful (YES at step 315), then processing ends. The page programming determination is performed by reading the program status from the page buffer. If the memory controller 211 determines that there is a program failure (NO at step 315), then the memory controller 211 re-loads the program data from the page buffer of the mirror memory device 213-2 (step 316). The program data is stored locally within data storage elements of the memory controller.

Next, the memory controller 211 loads the program data back into the page buffer of the designated memory device at step 317. Processing continues at step 314 by retrying to program the data into the memory cells of the designated memory device, details of which have also been provided above. In this example, it is assumed that another attempt to program the data into the same memory device is made. Alternatively, the data can be programmed into the memory cells of another memory device. Also, in this example, it is assumed that the mirror backup copy is maintained in the same place (device 213-2 for this example) until a successful page program operation is completed. Alternatively, a mirror backup copy can be made in a different location.

In some examples, the systems described herein are implemented using a flexible modular command structure, example details of which have already been provided. Further example details are provided in this section with reference to FIGS. 12 through 20. It is to be understood that the details provided in this section are very specific for exemplary purposes only.

FIG. 12 is a table of an example command set for flash memory with modular command in byte mode. The table includes 15 operations: Page Read, Page Read for Copy, Burst Data Read, Burst Data Load Start, Burst Data Load, Page Program, Block Erase Address Input, Page-pair Erase Address Input, Erase, Operation Abort, Read Device Status, Read Device Information Register, Read Link Configuration Register, and Write Link Configuration Register (device specific), and Write Link Configuration (broadcast). Each operation has a command including a Device Address (DA) (1 Byte) and an Operation (OP) Code (1 Byte). Some commands include a Row Address (3 Bytes), a Column Address (2 Bytes), and some commands include Input Data (1 to 2112 Bytes). 'X' is '0h' for "Bank 0". 'X' is '1h' for "Bank 1" where it is assumed for this specific example that each device has two memory banks. More generally each device has at least one memory bank. For the last command in the table, namely the write link configuration (broadcast), the device address is set to "FFh" to indicate a "broadcasting" command.

FIG. 13 is an example operation table. The table includes modes for each of a plurality of combinations of /RST (complement of a reset signal), /CE (complement of a chip enable signal), CSI (command strobe input), and DSI (data strobe input). The modes include Command Data Packet, Read Data Packet, NOP (NO Operation), Standby, and Reset.

All commands, addresses, and data are shifted in and out of the memory device, starting with the most significant bit (MSB). Command input (CI) signal is sampled at the positive or negative clock edge (i.e., at the crossing point of clocks—CK and /CK) while the command strobe input (CSI) signal is "high". Each command includes a 1-byte device address (DA) and 1-byte OP code and/or column-address/row-address/data-input bytes if necessary. Once the CSI transits logic "high", the 1-byte DA (Device Address) is shifted into a DA register, and then the 1-byte OP code is shifted into an OP code register. In so doing, the most significant bit (MSB) starts first on the CI signal and each bit is latched at the crossing of clocks CK and /CK while CSI is logic-HIGH state. However every input sequence in byte mode starts at a rising edge of clock CK (=falling edge of /CK). Depending on the command, the OP Code are followed by address bytes, data bytes, both or none as shown in FIG. 12. For this example, the address cycle has a 2-byte column address and 3-byte row address. FIG. 14 shows a definition of an example command and address format including the position of each bit.

For the memory devices connected in-series, a special device address (=FFh) is assigned for "Broadcast" operation. More generally, the address that is defined for broadcast mode operation can be defined on an implementation specific basis. This "Broadcast Device Address" may be used with any command. However, using the broadcast device address (FFh) along with the "read-type" commands is not recommended because the read data from the last device is the only valid output data.

In some implementations, the signal bus on a modular command Flash device is fully multiplexed as command, address and data all share the same pin(s). The CSI signal's logic-high state validates the command input (CI) signal which can be an n-bit wide signal containing multiplexed command/address/data information for the memory device. If the CSI signal stays in logic-low state, device ignores signal inputs from CI pins. The command input sequence normally consists of one-byte DA (Device Address) latch cycles, one-byte command latch cycles, address latch cycles (=3-bytes for row address or 2-bytes for column addresses) and/or data-input latch cycles up to 2,112 bytes. In 1-bit link mode, four clock-cycles at DDR (double data rate) make one byte of a serial packet. In 2-bit link mode, two clock-cycles at DDR (double data rate) make one byte of a serial packet. In 4-bit link mode, one clock-cycle at DDR (double data rate) makes one byte of a serial packet. Every set of command instructions may be followed by two extra CK and /CK transitions after CSI makes a HIGH to LOW transition. In some embodiments, an extra number of CK and /CK transitions after CSI transitions to low are used that are equal in number to 2+# of devices in the architecture with devices connected together in-series. Every input sequence defined in FIG. 12 is "byte-based", which means that CSI and CI should be valid for the unit of 8-latch cycles (=4 clock cycles at double data rate). If CSI makes a HIGH to LOW transition before the completion of byte, corresponding command and/or address sequences will be ignored by device. For the case of data input sequence, the last incomplete byte of input data will be ignored, but prior complete byte(s) of input data will be valid.

Figure 15:
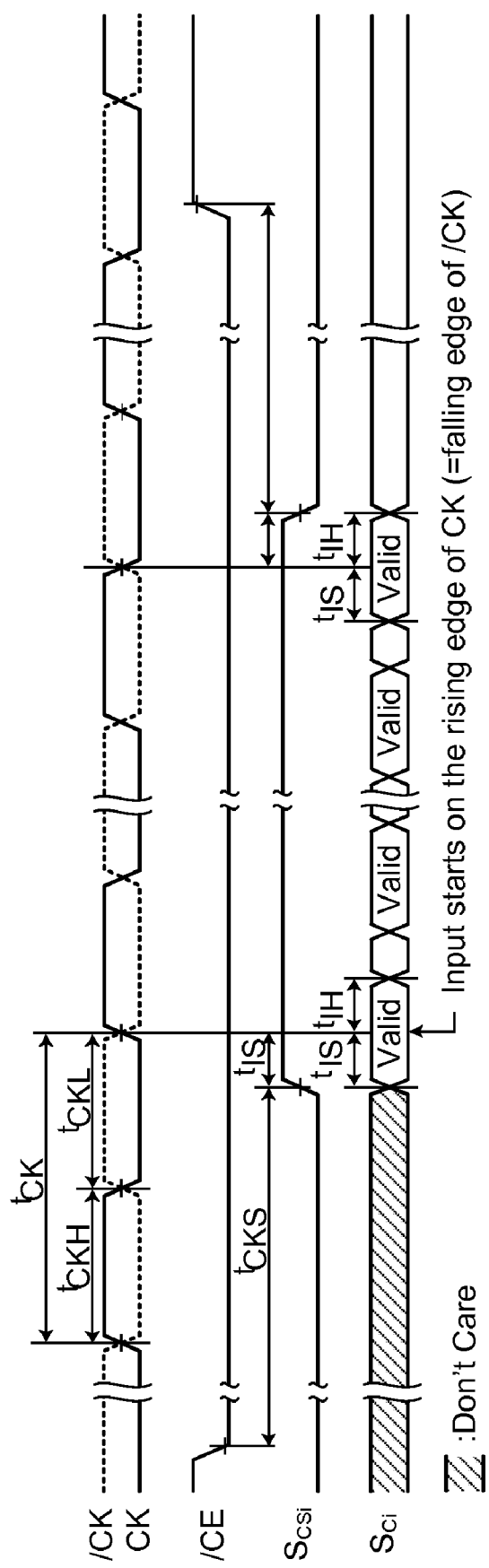
FIG. 15 is an example timing diagram showing basic input timing in a memory system.
Figure 16:
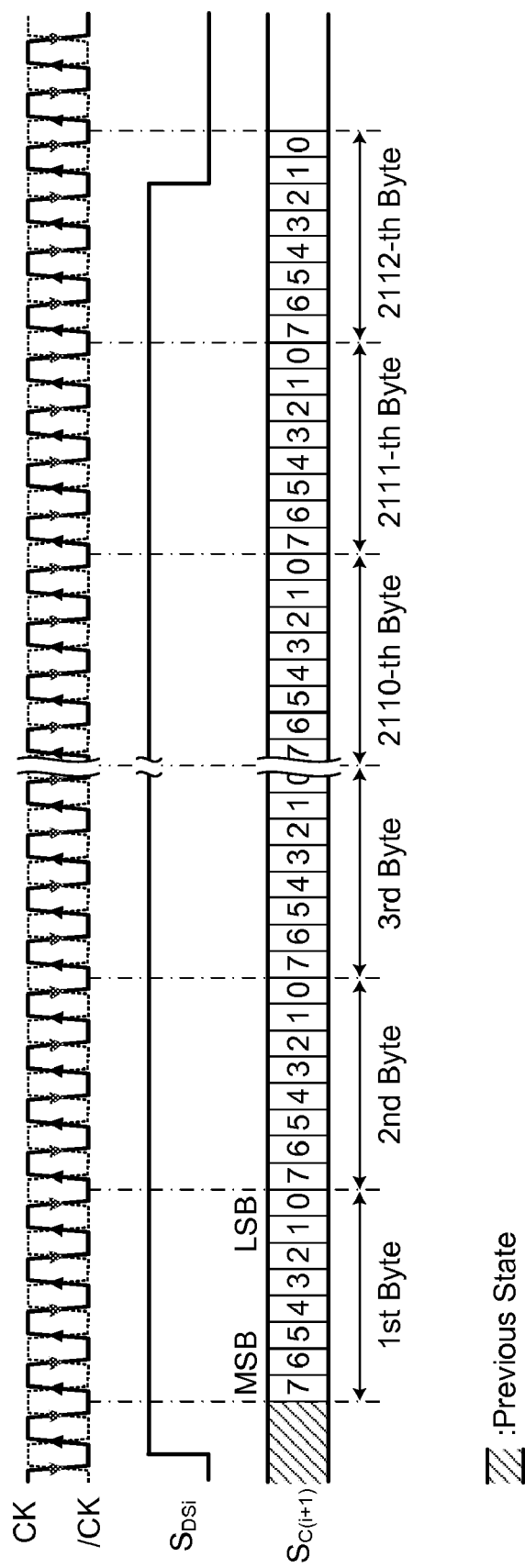
FIG. 16 is an example timing diagram showing an input sequence of bit streams in a modular command NAND flash memory system.

FIG. 15 is an example timing diagram showing basic input timing. All DA/Command/Address/Data-Inputs are asserted continuously through CI port(s) and captured on the crossing of clocks CK and /CK when /CE is "low" and the CSI signal is "high". The input data is shifted into the memory device, most significant bit (MSB) first on CI, each bit being latched at the crossing of clocks CK and /CK. An input sequence of bit streams is shown in FIG. 16. Every input sequence in byte mode starts at rising edge of clock CK as shown. Any input with incomplete byte will be ignored.

Figure 17:
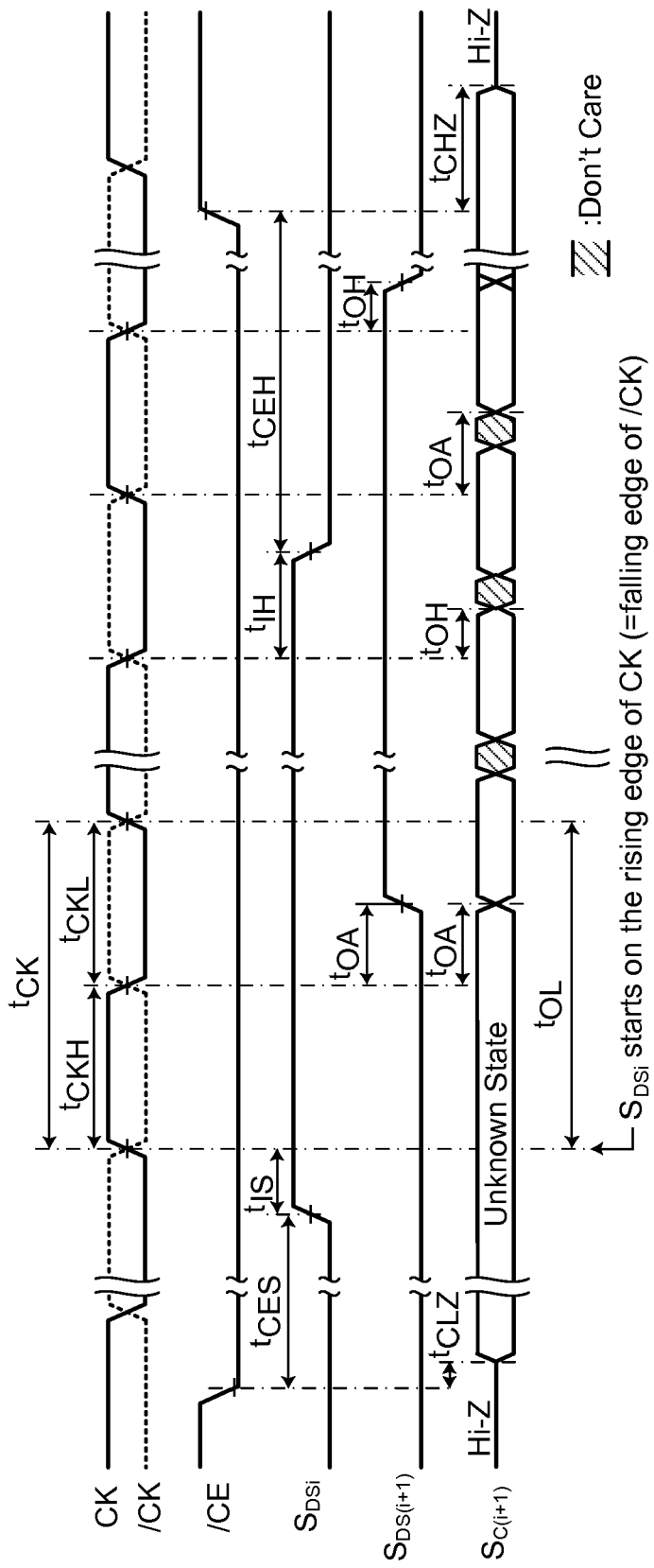
FIG. 17 is an example timing diagram showing basic output timing in a memory system.
Figure 18:
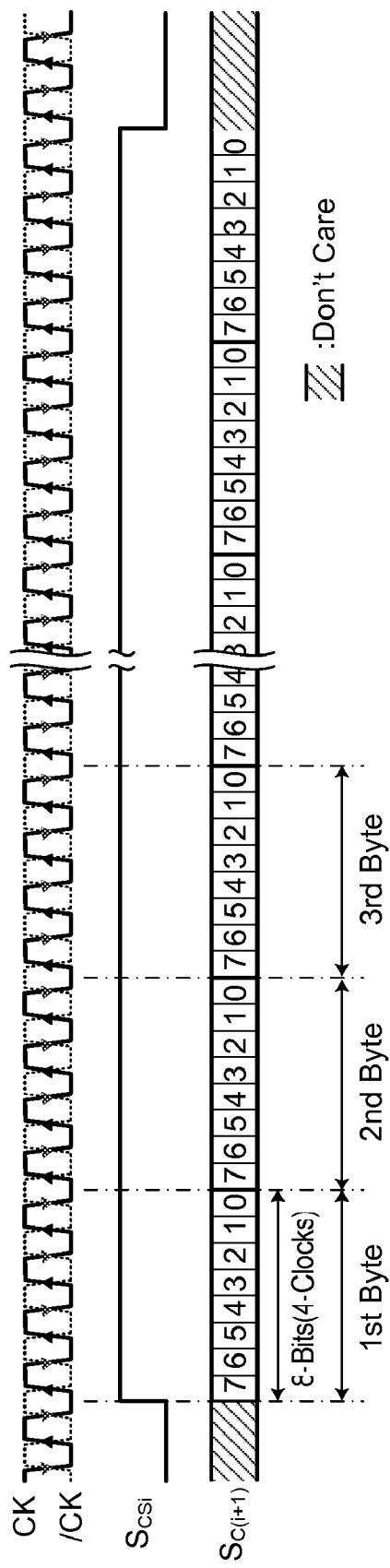
FIG. 18 is an example timing diagram showing an output sequence of bit streams in a memory system.

FIG. 17 is an example timing diagram showing basic output timing. The output on the command output (CO) is synchronously shifted out at the crossing of clocks CK and /CK when /CE is "low", and the DSI signal is "high". FIG. 18 shows an example output sequence in byte mode. The output data is shifted from the memory device, most significant bit (MSB) first on the CO signal, each bit being synchronized at the crossing of clocks CK and /CK. The DSI signal is activated referenced to the rising edge of CK so that every output sequence in byte mode starts at rising edge of CK with 1 clock read latency (=tOL) as shown in FIG. 17.

Figure 19:
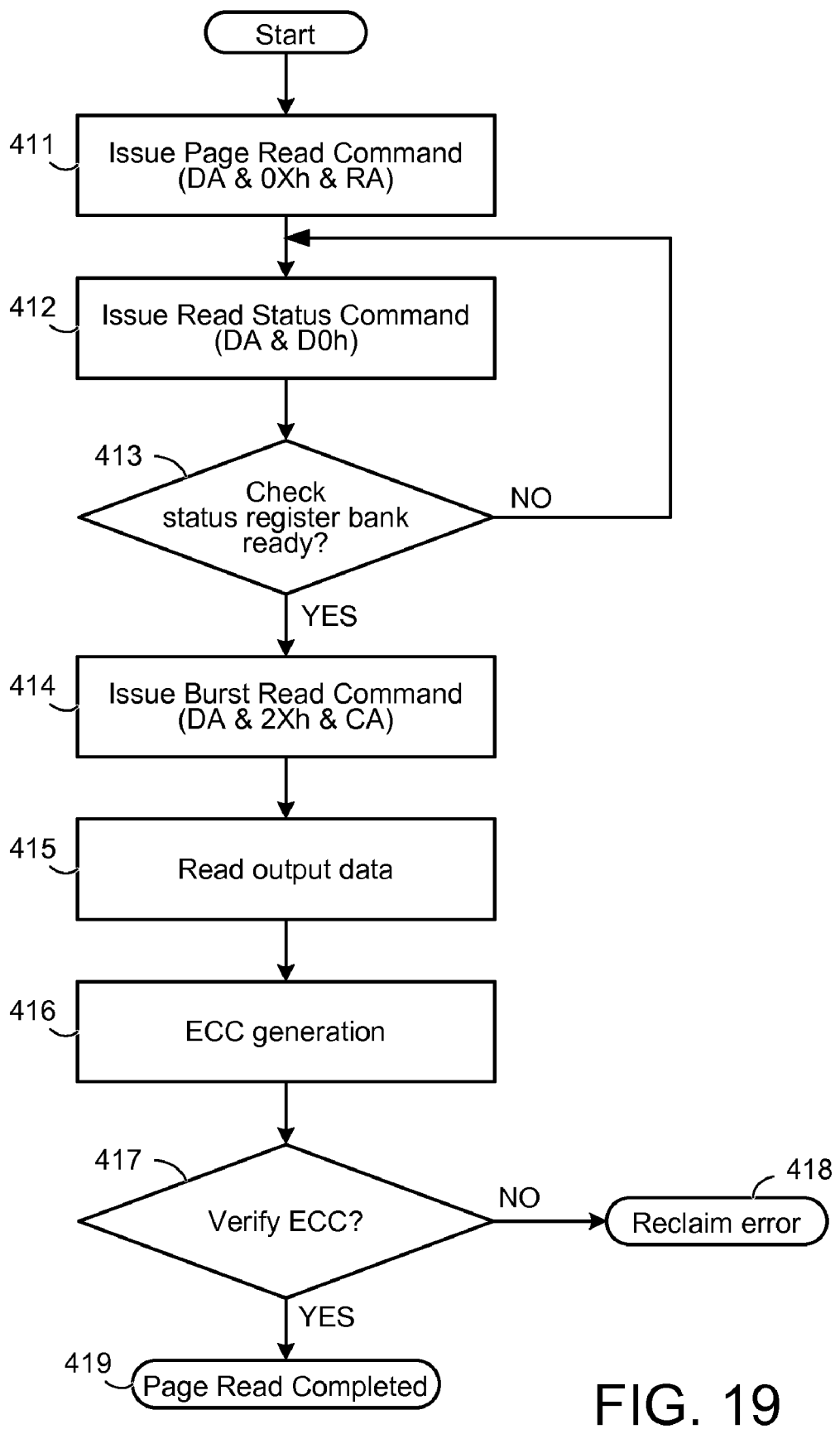
FIG. 19 is a flowchart of a method of page read operation.
Figure 20:
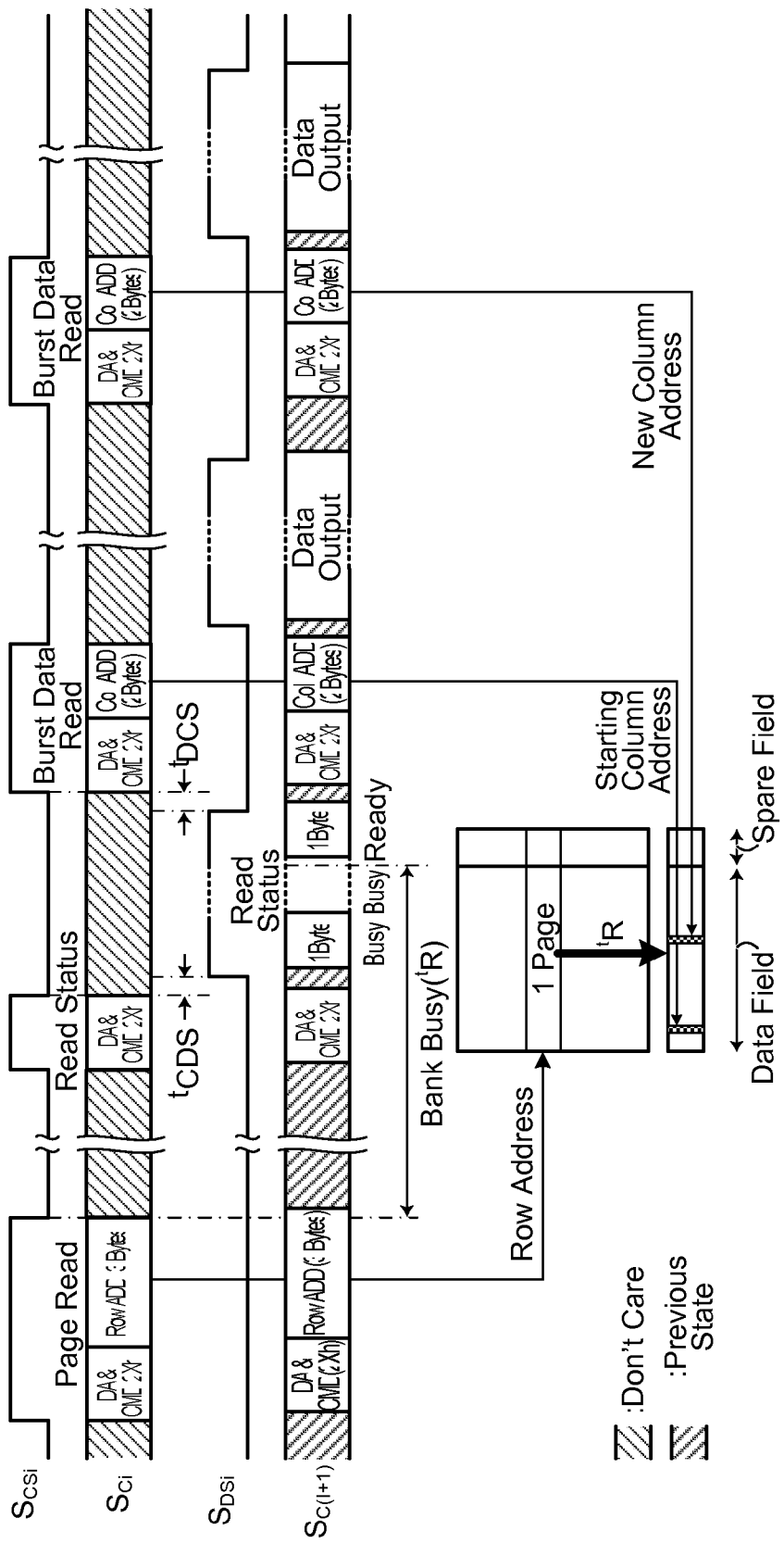
FIG. 20 is an example timing diagram showing page read and burst data read operations.

Two representative commands to show the feature of modular commands are described below, namely a Page Read (DA & 0Xh) and a Burst Data Read (DA & 2Xh) command. FIG. 19 shows a flowchart involving the use of these commands, and FIG. 20 shows an example command sequence.

With reference to FIG. 19, to enter the Page Read mode, at step 411 the memory controller issues the PAGE READ (DA & 0Xh) command to the command register over the CI along with three row address bytes. Issuing DA & 0Xh to the command register starts the address latch cycles at step 412. Three bytes of row address are input next. The internal page read operation starts once the address latch cycles are finished. The 2,112 bytes of data within the selected page are sensed and transferred to the page buffers in less than tR (transfer time from cell array to page buffers). The status register can be checked at step 413. After tR, a BURST DATA READ (DA & 2Xh) command (described in further detail below) along with two bytes of column address can be issued at step 414 and then the DSI signal can be enabled in order to read out page buffers' data, starting from the given column address, over the CO until the DSI signal goes low. If a user wants to monitor the internal page read status to determine whether the transfer from the cell array to page buffers is complete or not, the READ DEVICE STATUS (DA & D0h) command can be issued. Modular command flash has an 8-bit status register that the software can read during device operation.

The core access operations such as page read, page program and block erase take long time and their processing times are varied according to PVT (Process/Voltage/Temperature) change. So, whenever issuing core access commands, a user can monitor the status of each operation after asserting command without interrupting internal operations. The other purpose of the status register is to check whether or not the page program and block erase are performed without fail. In case of fail, a new row position is determined by the memory controller and it issues a new command containing new row address to write the same data that was written to the old row location that failed to be written. Without monitoring the status register, the memory controller does not know that the program and erase operations are done without fail.

After READ DEVICE STATUS (DA & D0h) command, using DSI, all 8-bit status is read from the status register until DSI goes to low. After the BURST DATA READ (DA & 2Xh) command has been issued and then DSI goes to high, the serial output timing as shown in FIG. 20 will result in outputting data at step 415, starting from the initial column address. The column address will be automatically increased during outputting data. At step 416, there is ECC generation. If the ECC is verified at step 417, then the page read is completed. Otherwise, at step 418 there is an error.

The BURST DATA READ (DA & 2Xh) command referred to above enables the user to specify a column address so the data at the page buffers can be read starting from the given column address within the selected page size while DSI is high. The burst data read mode is enabled after a normal PAGE READ (DA & 0Xh) command and page loading time (=tR). The BURST DATA READ (DA (& 2Xh) command can be issued without limit within the page. Every BURST DATA READ command can have same or different column address from the previous BURST DATA READ command. Only data on the current page buffers can be read. If a different page is to be read, a new PAGE READ (DA & 0Xh) command should be issued. And after tR, a new BURST DATA READ (DA & 2Xh) command can be issued to access new page data.

In the embodiments described above, the device elements and circuits are connected to each other as shown in the figures, for the sake of simplicity. In practical applications of the present invention, elements, circuits, etc. may be connected directly to each other. As well, elements, circuits etc. may be connected indirectly to each other through other elements, circuits, etc., necessary for operation of the memory devices or apparatus. Thus, in actual configuration of devices and apparatus, the elements and circuits are directly or indirectly coupled with or connected to each other.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for communicating with a serial interconnection of a plurality of memory devices interconnected in-series, the serial interconnection including at least first and second memory devices, each of the first and second memory devices having a store element and memory cells and being associated with a unique address in the serial interconnection, the method comprising:

loading data stored in a data storage to the store elements of the first and second memory devices of the serial interconnection;

instructing the first memory device to program the data loaded in its store element into its memory cells;

determining whether the data is successfully programmed into the memory cells of the first memory device, if not successfully programmed, a failure determination being provided;

recovering the data from the store element of the second memory device in response to the failure determination, the recovering comprising reading back the data from the store element of the second memory device without programming the loaded data into the memory cells of the second memory device;

storing the read back data in the data storage;

loading the read back and stored data to the store elements of the first and second memory devices of the serial interconnection; and freeing up space in the data storage where the read back data is stored before loading the data in the store elements of the first and second memory devices.

2. The method of claim 1, further comprising:
programming the read back and loaded data into the memory cells of the first memory device.

3. The method of claim 1, wherein the loading data stored in a data storage to the store elements of the first and second memory devices comprises:
transmitting a command to the serial interconnection, the command including address information for addressing a device of the serial interconnection.

4. The method of claim 3, wherein the address information is addressing the first and second memory devices of the serial interconnection.

5. The method of claim 4, wherein,
determining whether the command is addressed based on the address information and the unique addresses associated with the first and second memory devices, in a case of the first and second memory devices being addressed, an address determination being provided.

6. The method of claim 5, wherein the address information includes:
a first address for addressing the first memory device; and
a second address for addressing the second memory device.

7. A method for communicating with a serial interconnection of a plurality of memory devices interconnected in-series, the serial interconnection including at least first and second memory devices, each of the first and second memory devices having a store element and memory cells and being associated with a unique address in the serial interconnection, each of the unique addresses of the first and second memory devices being represented by a plurality of binary bits, the method comprising:
transmitting a command to the serial interconnection, the command including address information represented by a plurality of binary bits;
selecting the first and second memory devices in the serial interconnection by comparing the plurality of binary bits without one bit representing the address information to the plurality of binary bits representing the unique addresses of the first and second memory devices;
loading data stored in a data storage to the store elements of the first and second memory devices of the serial interconnection;
instructing the first memory device to program the data loaded in its store element into its memory cells;
determining whether the data is successfully programmed into the memory cells of the first memory device, if not successfully programmed, a failure determination being provided; and
recovering the data from the store element of the second memory device in response to the failure determination.

8. The method of claim 7, wherein:
at each of the first and second memory devices, determining whether the plurality of binary bits of the single address information excluding the least significant bit matches each of the unique addresses of the first and second memory devices excluding the least significant bit.

9. The method of claim 7, further comprising:
storing the recovered data in the data storage.

10. The method of claim 9, further comprising:
loading the recovered data to the store elements of the first and second memory devices of the serial interconnection.

11. The method of claim 10, further comprising:
freeing up space in the data storage where the recovered data is stored before loading the data in the store elements of the first and second memory devices.

* * * * *